US012222573B2

(12) United States Patent
Geens et al.

(10) Patent No.: US 12,222,573 B2
(45) Date of Patent: Feb. 11, 2025

(54) ADJUSTABLE CABLE MANAGEMENT SYSTEM

(71) Applicant: CommScope Technologies LLC, Hickory, NC (US)

(72) Inventors: Johan Geens, Bunsbeek (BE); Geert Jozef Maria Verbist, Herentals (BE)

(73) Assignee: CommScope Technologies LLC, Hickory, NC (US)

( * ) Notice: Subject to any disclaimer, the term of this patent is extended or adjusted under 35 U.S.C. 154(b) by 177 days.

(21) Appl. No.: 18/040,963

(22) PCT Filed: Aug. 6, 2021

(86) PCT No.: PCT/US2021/044998
§ 371 (c)(1),
(2) Date: Feb. 7, 2023

(87) PCT Pub. No.: WO2022/032130
PCT Pub. Date: Feb. 10, 2022

(65) Prior Publication Data
US 2023/0273386 A1 Aug. 31, 2023

Related U.S. Application Data

(60) Provisional application No. 63/062,636, filed on Aug. 7, 2020.

(51) Int. Cl.
*G02B 6/44* (2006.01)
(52) U.S. Cl.
CPC ......... *G02B 6/4458* (2013.01); *G02B 6/4448* (2013.01); *G02B 6/44515* (2023.05)

(58) Field of Classification Search
CPC .................. G02B 6/4458; G02B 6/44515
See application file for complete search history.

(56) References Cited

U.S. PATENT DOCUMENTS

| 803,374 A | 10/1905 | Volkerding et al. |
| 4,922,056 A | 5/1990 | Larsson |

(Continued)

FOREIGN PATENT DOCUMENTS

| CN | 204190323 U | 3/2015 |
| CN | 204928011 U | 12/2015 |

(Continued)

OTHER PUBLICATIONS

International Search Report for PCT/US2021/044998 mailed Nov. 25, 2021.

(Continued)

*Primary Examiner* — Sung H Pak
(74) *Attorney, Agent, or Firm* — Merchant & Gould P.C.

(57) ABSTRACT

A cable management system including cable support members held by cross-members to define a cable winding path. Certain types of cross-members are selectively configurable in a first angular position or a second angular position relative to each other. Certain types of mounting brackets hold the cross-members in the selected angular position. Certain types of the cable support members are positionable at any of a plurality of positions along the cross-members to size the cable winding path as desired. Certain types of cross-member support multiple pairs of oppositely facing cable support members to define multiple layers of the cable winding path.

28 Claims, 31 Drawing Sheets

(56) References Cited

U.S. PATENT DOCUMENTS

| | | |
|---|---|---|
| 5,495,549 A | 2/1996 | Schneider et al. |
| 5,668,911 A | 9/1997 | Debortoli |
| 6,135,624 A | 10/2000 | Masters et al. |
| 6,215,937 B1 | 4/2001 | Dinh |
| 6,659,389 B1 | 12/2003 | Hoffmann et al. |
| 7,038,127 B2 | 5/2006 | Harwood |
| 7,477,824 B2 | 1/2009 | Reagan et al. |
| 7,489,849 B2 | 2/2009 | Reagan |
| 7,558,458 B2 | 7/2009 | Gronvall et al. |
| 7,580,607 B2 | 8/2009 | Jones et al. |
| 7,627,222 B2 | 12/2009 | Reagan et al. |
| 7,680,388 B2 | 3/2010 | Reagan et al. |
| 7,844,160 B2 | 11/2010 | Reagan et al. |
| 8,213,760 B2 | 7/2012 | Rudenick et al. |
| 8,718,434 B2 | 5/2014 | Gronvall et al. |
| 9,939,602 B2 | 4/2018 | Allen |
| 11,428,886 B2 * | 8/2022 | Cams .............. G02B 6/44528 |
| 2004/0035600 A1 | 2/2004 | Dietrichson et al. |
| 2006/0198593 A1 * | 9/2006 | Ivancevic .............. G02B 6/48 385/135 |
| 2006/0291144 A1 | 12/2006 | Verding |
| 2008/0019654 A1 | 1/2008 | Corbeels |
| 2008/0050085 A1 | 2/2008 | Tinucci |
| 2008/0224006 A1 | 9/2008 | Call et al. |
| 2008/0292261 A1 | 11/2008 | Kowalczyk et al. |
| 2009/0238531 A1 | 9/2009 | Holmberg et al. |
| 2009/0317047 A1 | 12/2009 | Smith et al. |
| 2010/0006723 A1 | 1/2010 | Yan |
| 2010/0027954 A1 | 2/2010 | Gronvall et al. |
| 2010/0189404 A1 | 7/2010 | Rudenick et al. |
| 2011/0103760 A1 | 5/2011 | Cote et al. |
| 2011/0123166 A1 | 5/2011 | Reagan et al. |
| 2016/0033056 A1 | 2/2016 | Bishop et al. |
| 2018/0193096 A1 | 7/2018 | Nau, Jr. et al. |
| 2019/0041597 A1 | 2/2019 | Marcouiller et al. |
| 2019/0219198 A1 | 7/2019 | Chappell, II et al. |
| 2019/0248617 A1 | 8/2019 | Kiziah |
| 2022/0397734 A1 | 12/2022 | Geens et al. |

FOREIGN PATENT DOCUMENTS

| | | |
|---|---|---|
| CN | 105929511 A | 9/2016 |
| EP | 0 932 260 A1 | 7/1999 |
| EP | 4 036 623 A1 | 8/2022 |
| JP | 4-246601 A | 9/1992 |
| JP | 2001-242325 A | 9/2001 |
| JP | 2002-107592 A | 4/2002 |
| JP | 2007-267489 A | 10/2007 |
| KR | 20-2010-0001584 U | 2/2010 |
| KR | 20-0454611 Y1 | 7/2011 |
| KR | 20-0455528 Y1 | 9/2011 |
| KR | 10-2085836 B1 | 5/2020 |
| WO | 2010/062626 A1 | 6/2010 |
| WO | 2019/209645 A1 | 10/2019 |
| WO | 2021/092177 A1 | 5/2021 |

OTHER PUBLICATIONS

Coyote 9.5"×19" (292 mm×509 mm) Dome Closure, Preformed Line Productts, Aug. 2012, 16 pages. (retrieved via https://plp.com/vn/images/pdfs/Communications/Fiber_Networks/Coyote_Fiber_Optic_Closures/Coyote_Dome_Closure/sp3138-1coydome9.5x19_2.pdf) (Year: 2012).

Extended European Search Report for Application No. 21853814.8 mailed Sep. 10, 2024.

Fiberlign ADSS Storage Bracket, Preformed Line Products, Jan. 2017, 4 pages. (retrieved via https://plp.com/images/pdfs/Energy/Fiber_Optics/Cable_Storage_Systems/FIBERLIGN_ADSS_Storage_Bracket/SP3186-3_FibrlgnADSSstorbrkt.pdf) (Year: 2017).

Fiberlign Cable Storage 2 Assembly for OPGW, Preformed Line Products, Mar. 2017, 4 pages. (retrieved via (https://plp.com/za/images/pdfs/Energy/Fiber_Optics/Cable_Storage_Systems/FIBERLIGN_Cable_Storage_2_for_0PGW/SP3233-1_FIBERLIGN_Cable_Storage_2_Assembly_for_OPGW.pdf) (Year: 2017).

Photo showing admitted prior art as of Apr. 23, 2018, 1 page.

* cited by examiner

ADJUSTABLE CABLE MANAGEMENT SYSTEM

CROSS-REFERENCE TO RELATED APPLICATIONS

This application is being filed as a National Stage Application of PCT International Patent Application PCT/US2021/044998, filed on Aug. 6, 2021, and claims the benefit of U.S. Patent Application Ser. No. 63/062,636, filed on Aug. 7, 2020, the disclosures of which are incorporated herein by reference in their entireties.

BACKGROUND

Fiber optic communication systems allow service providers to deliver high bandwidth communication capabilities to customers. Fiber optic communication systems employ a distribution network of fiber optic cables to transmit large volumes of data over long distances. A drop cable is typically the last leg of the distribution network before reaching an end subscriber such as a house, apartment, office, place of business, and the like. Typically, a drop cable is run from an optical terminal before reaching an end subscriber location.

Optical terminals can be mounted on a variety of structures in the field including walls, poles, cables, and the like. In some instances, mounting brackets can be used to mount the optical terminals to a variety of structures in the field.

It may sometimes be necessary to store excess fiber optic cable at the site of the drop terminal. However, there is often no space for storing or holding excess fiber optic drop cable at the location of the drop terminal. Improvements are desirable for a mounting bracket arrangement that can accommodate an enclosure and provide storage for excess drop cable in an efficient and safe manner.

SUMMARY

Some aspects of the disclosure are directed to a cable management system including cable support members held by cross-members to define a cable winding path.

In certain implementations, the cross-members are selectively configurable in a first angular position or a second angular position relative to each other. In certain examples, each cross-member includes first surfaces that engage when the cross-members are disposed in the first angular position and second surfaces that engage when the cross-members are disposed in the second angular position. In certain examples, the first and second surfaces are recessed so that the cross-members are mounted in a common plane.

In certain examples, a mounting bracket holds the cross-members in the selected angular position. In some examples, the mounting bracket is configured to hold the cross-members in only one of the angular positions. In other examples, the mounting bracket is adjustable to hold the cross-members in either of the angular positions. In certain examples, the cross-members extend along a common plane in either angular position. In certain implementations, the mounting bracket holds the cross-members to a pole or other mounting location. In certain implementations, the mounting bracket is configured to receive an enclosure or other equipment.

In certain implementations, the cross-members are connected together by inserting a fastener through aligned mounting apertures. In certain examples, the cross-members can be positioned so that any of the mounting apertures of one cross-member can align with any of the mounting apertures of another cross-member. In certain examples, the cross-members can be mounted in an asymmetric arrangement. In certain examples, the same mounting apertures can be selectively used to mount the cross-members together and to mount cable support members to the cross-members.

In some implementations, the cable support members are formed with the cross-members. In other implementations, the cable support members are separate pieces from the cross-members.

In certain implementations, the cable support members are adjustable along the lengths of the cross-members. In some examples, each cross-member defines a plurality of positions at which the cable support members can be selectively mounted. In other examples, each cable support member can be mounted at any desired position along a respective cross-member. For example, the cable support member can be locked in the desired position using a set screw or other securement mechanism. Mounting the cable supports at radially outward positions provides a larger cable winding path compared to mounting the cable supports at radially inward positions.

In some implementations, each cross-member supports a pair of oppositely facing cable support members. In other implementations, each cross-member may hold multiple pairs of oppositely facing cable support members to define multiple layers of the cable winding path.

In certain implementations, a stiffening member can be snap-fit or otherwise mounted to a cable support member to provide structural support against a load of the cable.

In certain implementations, a label can be snap-fit or otherwise mounted to a cable support member.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
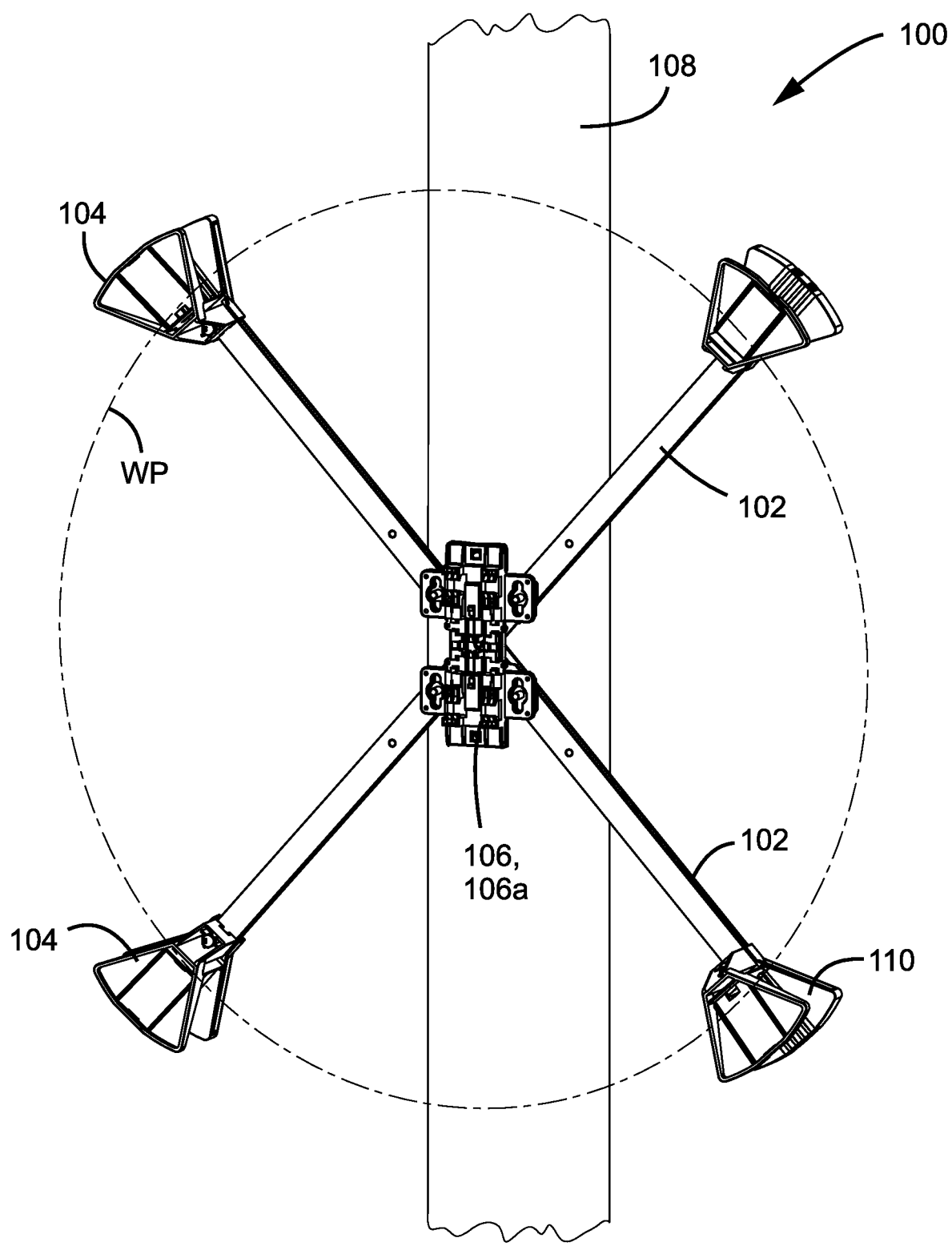
FIG. 1 is a perspective view of an example cable management system including a framework of cross-members configured to couple to a first example mounting bracket, the cable management system also including cable support members mounted to the cross-members to define a winding path.

Reference will now be made in detail to exemplary aspects of the present disclosure that are illustrated in the accompanying drawings. Wherever possible, the same reference numbers will be used throughout the drawings to refer to the same or like parts.

The present disclosure is directed to a cable management system to store excess length of cable routed to an enclosure or other equipment. The cable management system is configured to mount to a surface (e.g., a pole, a wall, etc.) using a mounting bracket. The mounting bracket also is configured to receive and retain the enclosure or other equipment at the surface.

Referring to the figures in general, a cable management system 100, 200 includes cross-members 102, 202 coupled to a mounting bracket 106, 206. FIGS. 1-23 illustrate a first example implementation of a cable management system 100 including cross-members 102 that mate together at a designated region of each cross-member. FIGS. 24-36 illustrate a second example implementation of a cable management system 200 including cross-members 202 that can be connected together in a selected one of multiple possible configurations.

In the depicted example of FIG. 1, the mounting bracket 106, 206 holds the cross-members 102, 202 to a pole 108. In other examples, the mounting bracket 106, 206 can attach the cross-members 102, 202 to a vertical wall or other structure. The mounting bracket 106, 206 has a first interface that attaches to the cross-members 102, 202. In certain implementations, the mounting bracket 106, 206 has a second interface that attaches to an enclosure or other equipment. In the depicted example, the second interface is disposed at an opposite side of the mounting bracket from the first interface. Additional information about suitable mounting brackets is disclosed in U.S. Provisional Appl. No. 62/992,592, filed Mar. 20, 2020, and titled "Telecommunications Enclosure Mounting System," the disclosure of which is hereby incorporated herein by reference in its entirety.

Cable support members 104, 204 are disposed at the cross-members 102, 202. The cable support members 104, 204 cooperate to define a cable winding path WP long which excess length of a cable 114, 214 can be routed. In the depicted example of FIG. 1, the cable support members 104, 204 are disposed at axial ends of the cross-members 102, 202. In other examples, the cable support members 104, 204 can be offset radially inwardly from the axial ends (e.g., see FIGS. 11, 12, and 33). Each cable support member 104, 204 defines a radially-outwardly facing channel 110, 210 that guide the cable along the cable winding path WP.

Figure 2:
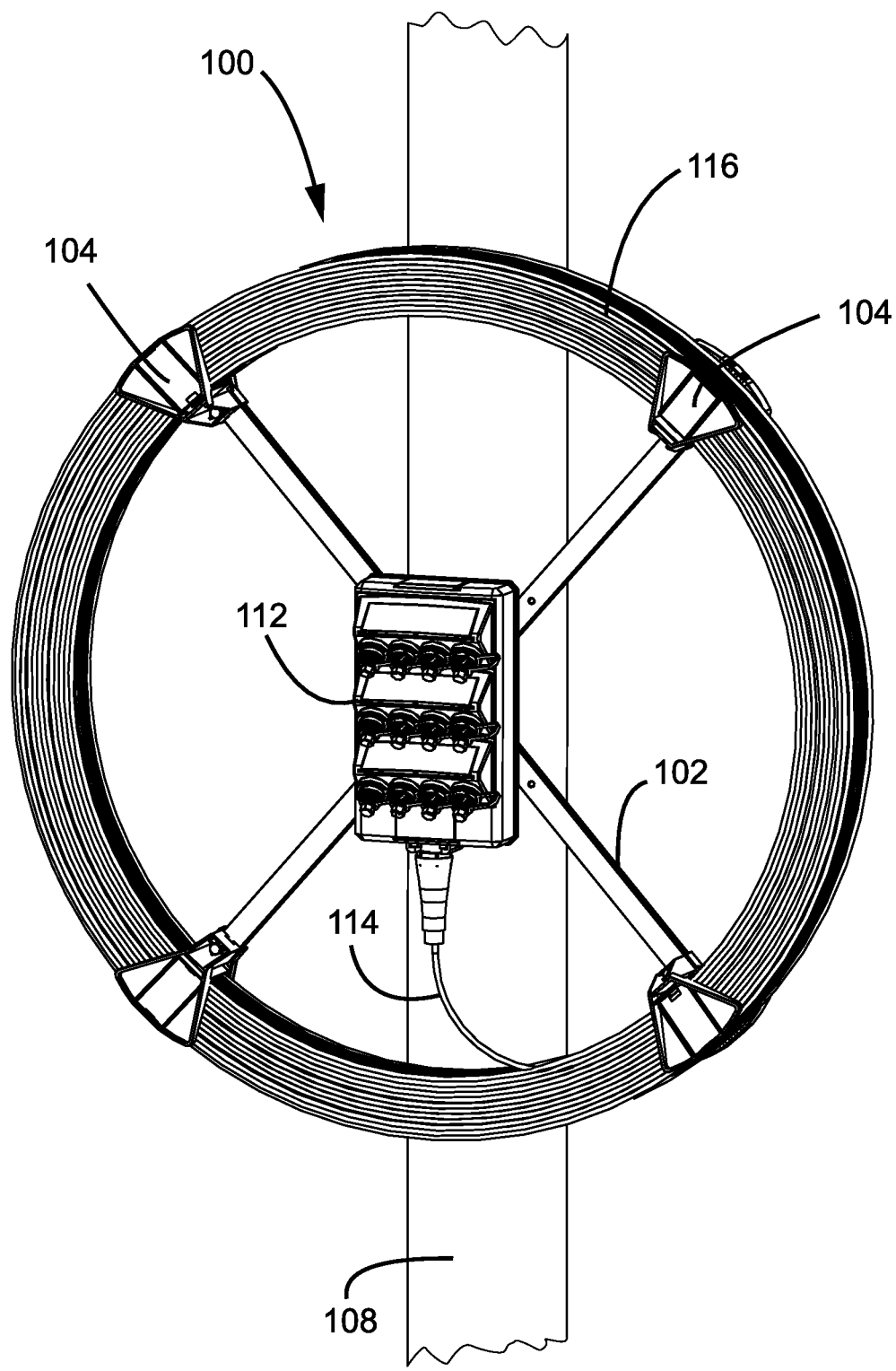
FIG. 2 is a perspective view showing a communications enclosure disposed at the mounting bracket of FIG. 1 and a section of cable coiled in a winding path around the cable support members of FIG. 1 to store excess length of the cable.
Figure 3:
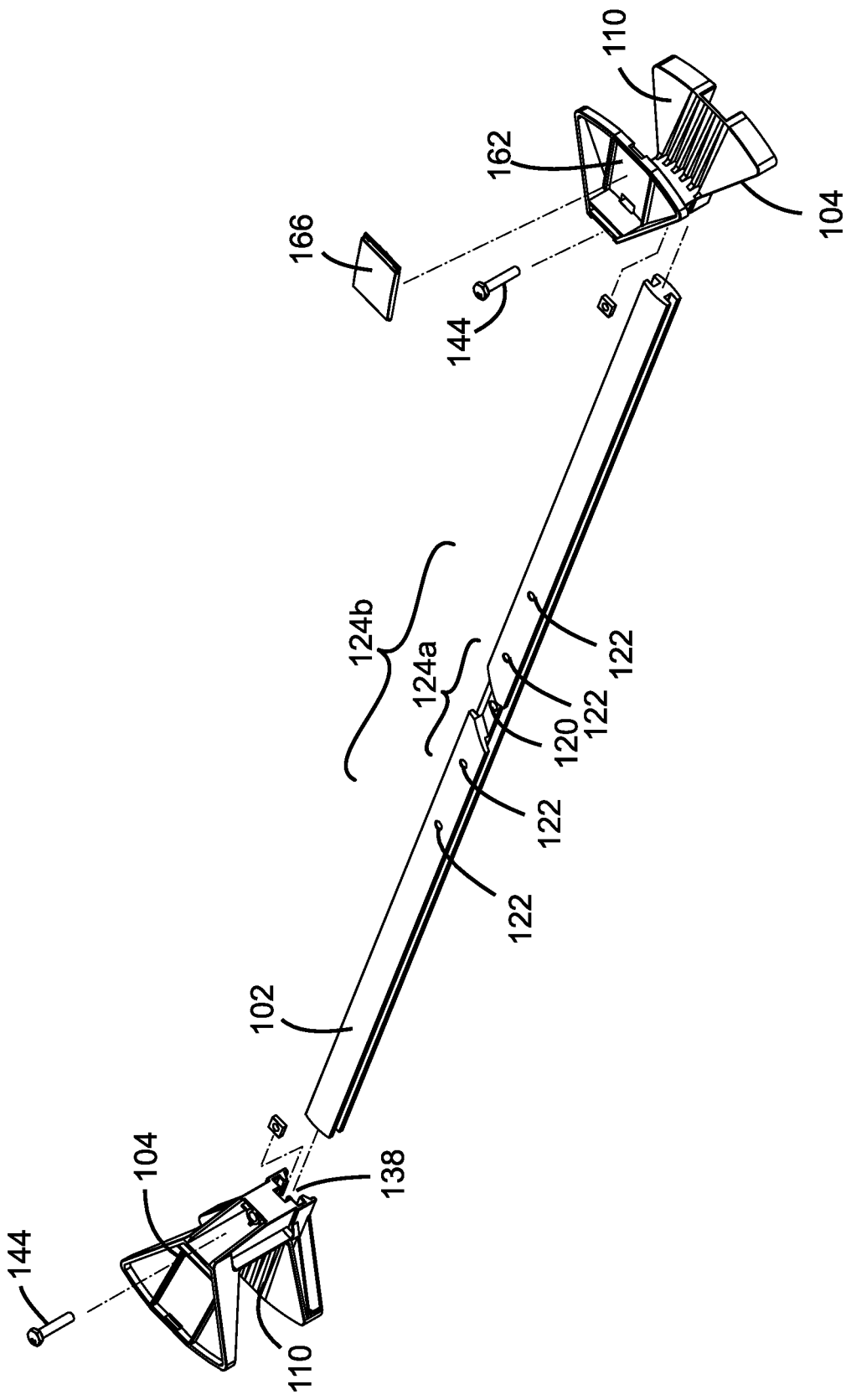
FIG. 3 shows two cable support members exploded outwardly from a cross-member of the framework of FIG. 1.

As shown in FIG. 2, an enclosure 112 or other equipment can be installed at the mounting bracket 106, 206 to deploy the enclosure 112 in the field (e.g., at the pole 108). A cable 114, 214 routed to the enclosure 112 or to the pole 108 is wrapped in coils 116, 216 around the winding path WP. In some examples, the cable 114, 214 is coupled to the enclosure 112 and routed along the winding path WP when the enclosure 112 is installed at the mounting bracket 106, 206. In other examples, the cable 114, 214 can be routed to the cable management system 100, 200 prior to installation of the enclosure 112. In such examples, an end of the cable 114, 214 can be stored at the cable management system 100, 200 until the enclosure 112 is deployed and then plugged into or otherwise connected to the enclosure 112.

In some implementations, the enclosure 112 is an optical enclosure for use with an optical cable 114, 214. In certain implementations, the optical enclosure 112 carries one or more de-mateable connection interfaces (e.g., optical adapter ports). In an example, the de-mateable connection interfaces are ruggedized (e.g., have an environmental seal and a robust construction). In certain implementations, the enclosure 112 is re-enterable and contains optical components (e.g., optical power splitters, wave division multiplexers, optical splice holders, etc.). In other implementations, the enclosure 112 is an electrical enclosure for use with an electrical cable 114, 214 (e.g., a data cable, a power cable, etc.). In still other implementations, the enclosure 112 is a hybrid enclosure for use with a hybrid cable 114, 214 (e.g., a cable including both an optical fiber and an electrical conductor). A hybrid enclosure 112 may hold an optical-to-electrical converter.

FIGS. 3-9 illustrate components of the cable management system 100. The cable management system 100 includes at least one cross-members 102 configured to hold one or more cable support members 104. In certain examples, the cable management system 100 includes two cross-members 102 that cross over each other in an X-shaped configuration as will be described in more detail herein. A bolt, pin, or other connecting structure may pass through both cross-members 102 at an intermediate location (e.g., center) 125 of both.

In certain examples, each cross-member 102 holds two oppositely-facing cable support members 104. The cross-member 102 defines one or more fastener openings 122 at the intermediate location 125 between the cable support members 104 for attaching the cross-member 102 to a mounting bracket 106. In certain examples, multiple sets 124a, 124b of fastener openings 122 are provided to fit multiple types of mounting brackets as will be described in more detail herein with reference to FIGS. 18-21.

In certain implementations, the cross-member 102 also defines a recess 120 at the intermediate location 125. The recess 120 enables two cross-members 102 to be mounted together along a common plane RP by mating the recesses 120 of the two cross-members 102 (e.g., see FIG. 9). For example, the recess 120 of each of two cross-members 102a, 102b defines a respective mating surface 120a, 120b at which the cross-members engage each other.

Figure 4:
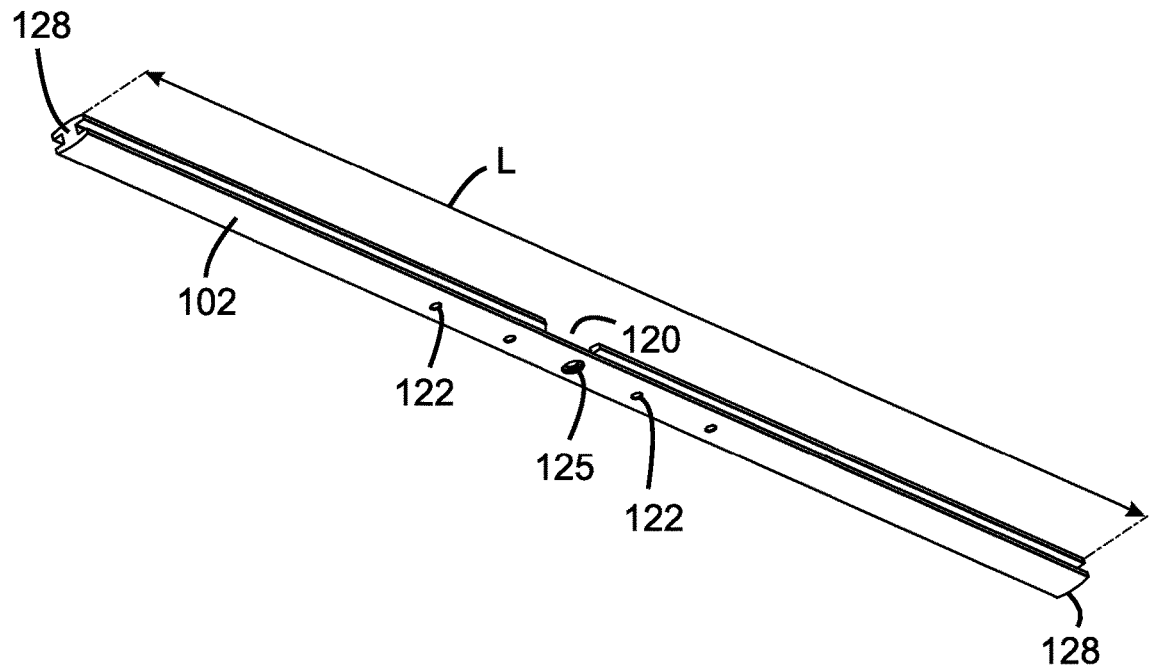
FIG. 4 is a rear perspective view of the cross-member of FIG. 3.
Figure 5:
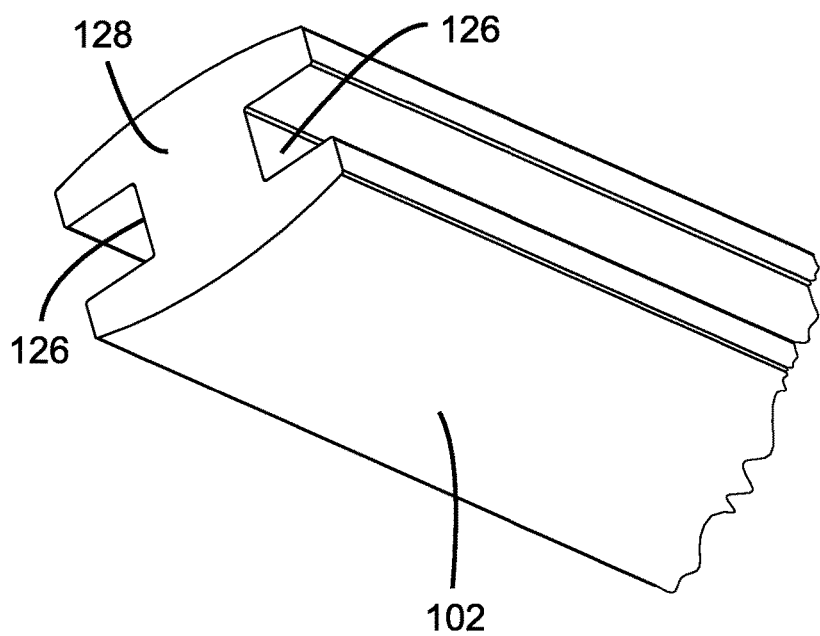
FIG. 5 is an enlarged view of an axial end of the cross-member of FIG. 4.

As shown in FIGS. 4 and 5, each cross-member 102 is profiled to define first engagement structures 126 extending along a length L of the cross-member 102 from opposite axial ends 128. In the depicted example, the first engagement structures 126 include oppositely facing channels defined into the cross-member 102. In other examples, the first engagement structures 126 include protrusions.

Figure 6:
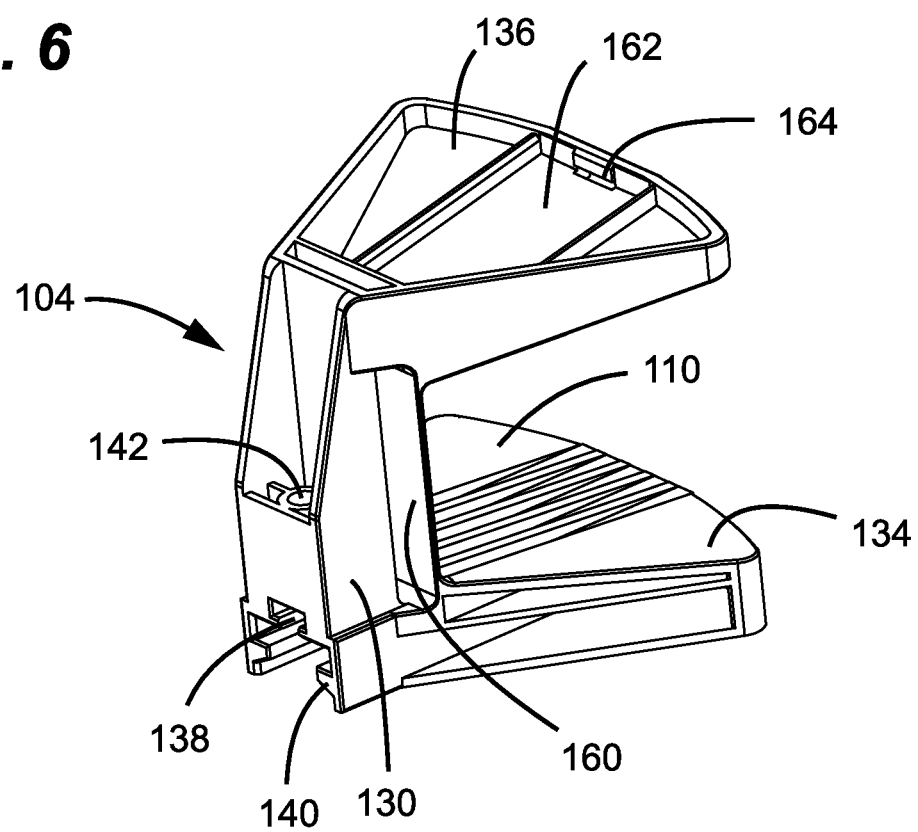
FIGS. 6-7 are various views of the cable support member of FIG. 1.
Figure 7:
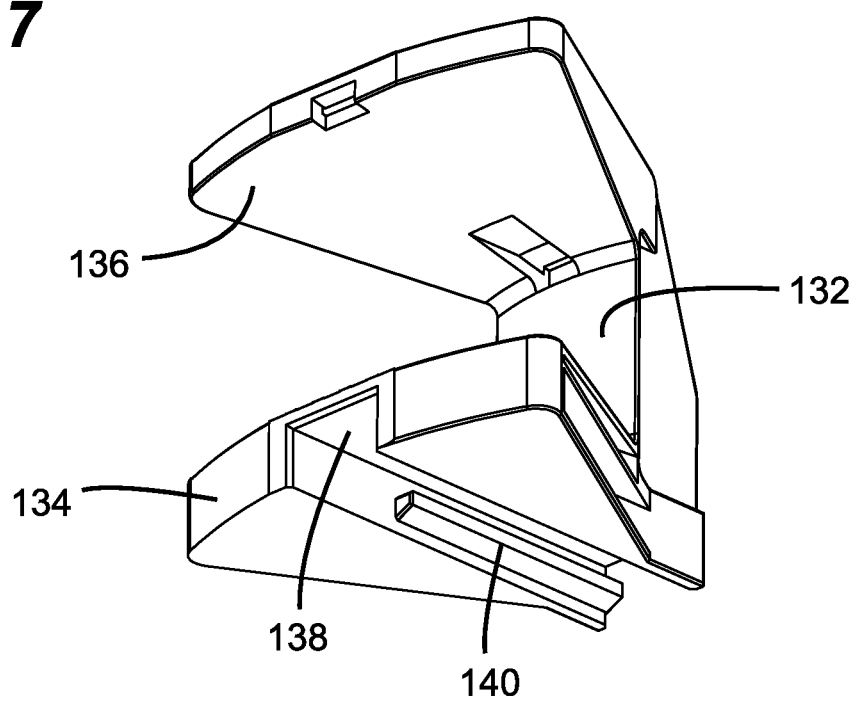
Figure 8:
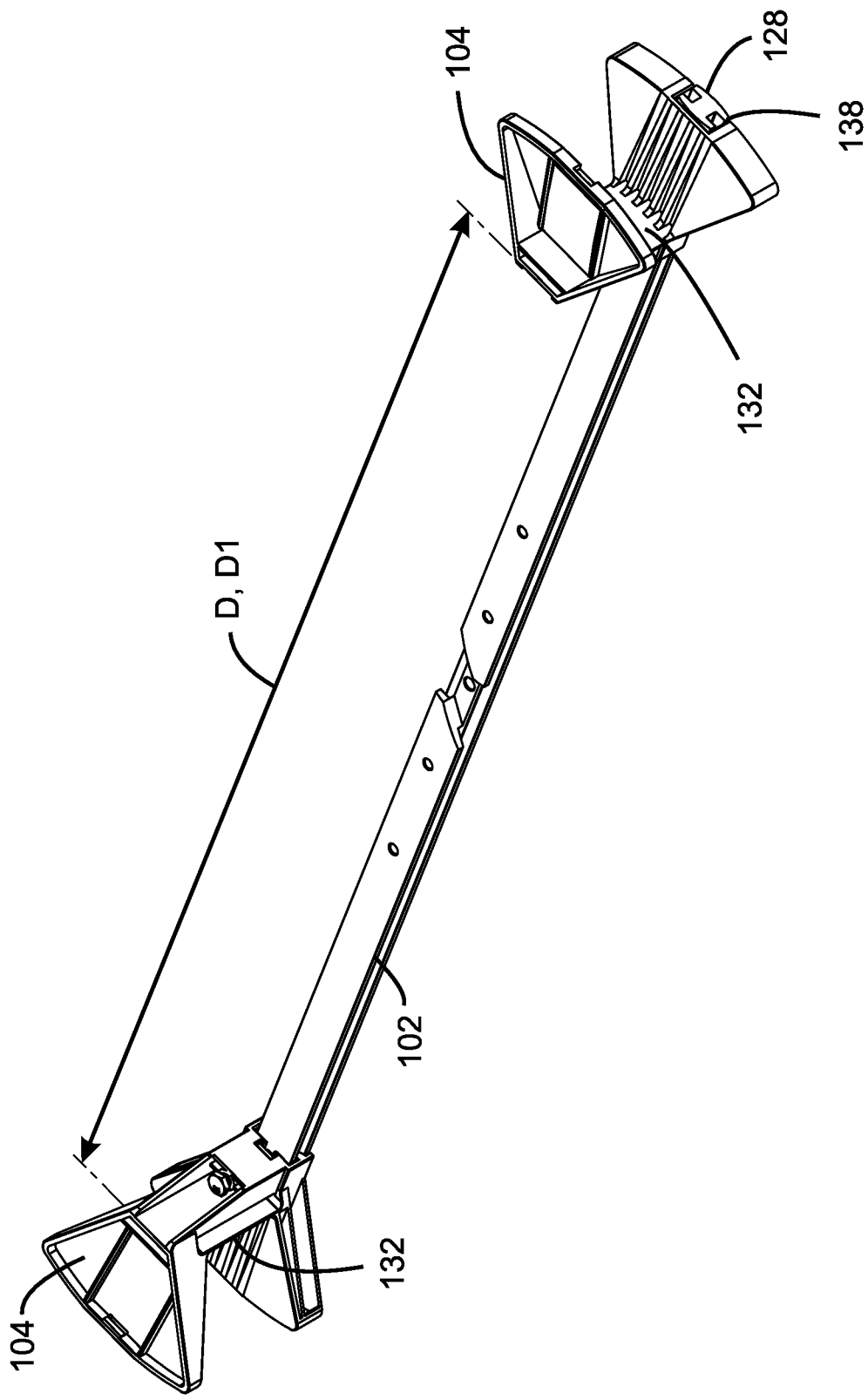
FIG. 8 shows the cable supports and cross-member of FIG. 3 assembled together.
Figure 9:
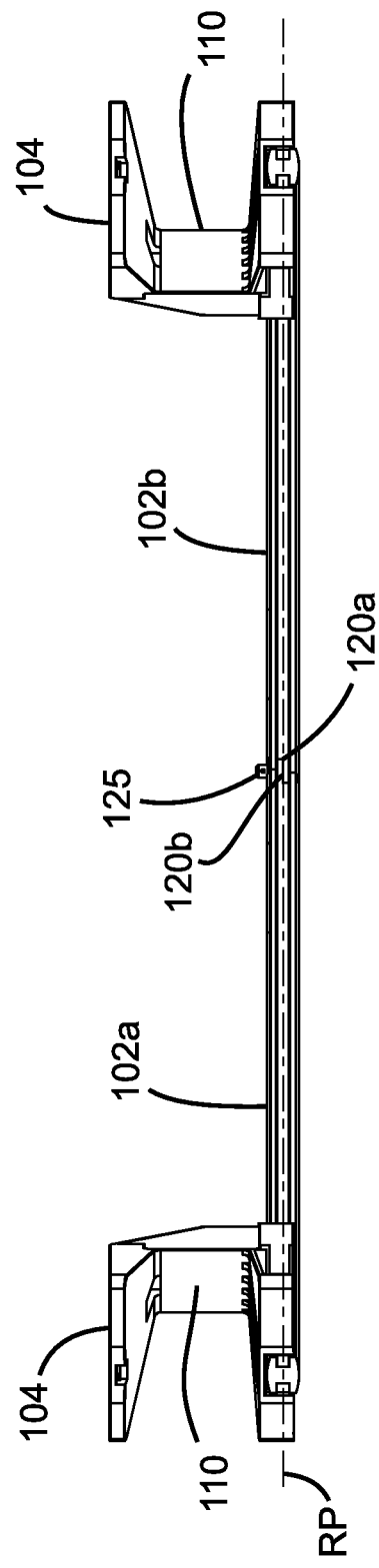
FIG. 9 is a side elevational view of the cable management system of FIG. 1 with the pole and mounting bracket removed for ease in viewing.

FIGS. 6-7 illustrate an example cable support member 104 suitable for use with the cross-member 102 shown in FIGS. 4 and 5. The cable support member 104 has a body 130 including first and second channel walls 134, 136 extending outwardly from opposite ends of a cable support surface 132 to define the guide channel 110. In certain examples, the cable support surface 132 defines a bend radius limiter to protect the cable routed through the channel 110. In certain examples, the first and second channel walls 134, 136 are spaced sufficiently far apart to accommodate multiple windings (e.g. coils) of a cable through the channel 110.

In some implementations, the body 130 defines a mounting channel 138 through which the cross-member 102 extends when the cable support member 104 is installed at the cross-member 102. The mounting channel 138 extends generally transverse to the cable guide channel 110. The term "generally" is used to account for the curved surface of the cable support surface 132. In certain examples, the mounting channel 138 is defined through the first channel wall 134. The mounting channel 138 extends past the cable support surface 132, along the first channel wall 134, to a radially outer end of the first channel wall 134. In other implementations, an exterior of the cable support member 104 can be mounted to the cross-member 102 (e.g., by inserting a fastener through both the cable support member 104 and the cross-member 102).

Second engagement structures 140 are disposed within the mounting channel 138. The second engagement structures 140 engage the first engagement structures 126 of the cross-member 102 when the cable support member 104 is mounted to the cross-member 102. In certain examples, the first and second engagement structures 126, 140 are configured to enable the cable support member 104 to slidingly mount to the cross-member 102. In the depicted example, the second engagement structures 140 include protrusions that fit within the channels 126 of the cross-member 102. In other examples, the second engagement members 140 may define channels to receive protruding first engagement members.

Figure 10:
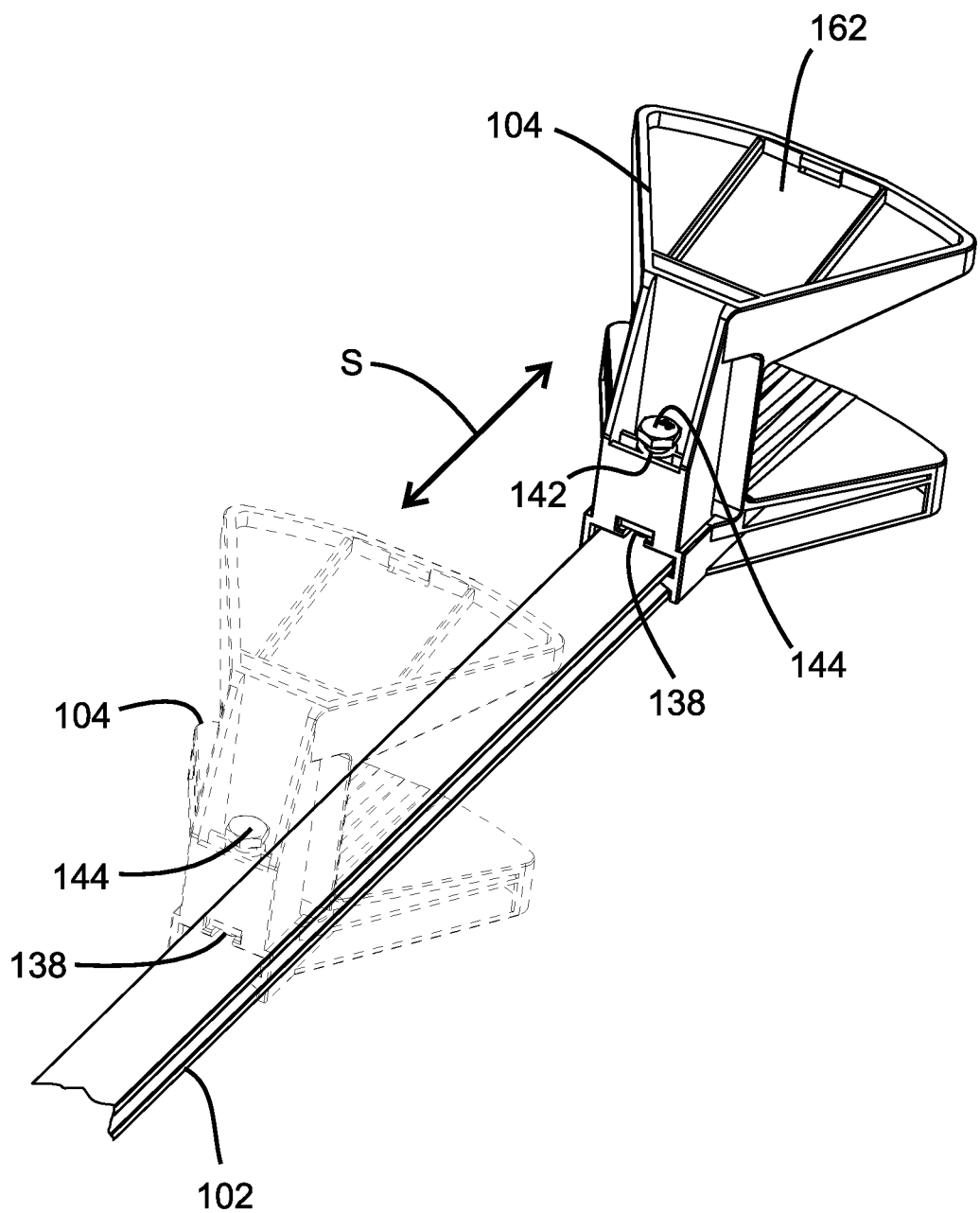
FIG. 10 shows the cable support member moving between first and second positions along the cross-member.

In some implementations, cable support members 104 are mounted at the axial ends 128 of the cross-member 102. Such a configuration provides a maximum transverse cross-dimension D, D1 of the winding path WP. As shown in FIG. 10, the transverse cross-dimension D, D1 and, hence, the length of the winding path WP is adjustable by moving the cable support members 104 to different positions along the cross-member 102. For example, a cable support member 104 can be positioned at any of multiple positions along the length L of the cross-member 102 by sliding the cable support member 104 relative to the cross-member 102 along a slide path S. In FIG. 10, a cable support member 104 is shown in solid lines at an outermost axial position and is shown in dashed lines moved radially inwardly to a different axial position.

In certain implementations, each cable support member 104 can be releasably secured in a particular position along the length L of the cross-member 102. In some implementations, the cross-member 102 defines pre-determined axial positions along the length L at which the cable support member 104 can be secured. In other implementations, the cable support member 104 can be secured at any axial position along the length L of the cross-member 102. In certain examples, each cable support member 104 is secured to the cross-member 102 using a set screw 144. In certain examples, the set screw 144 is carried with the cable support member 104. For example, the cable support body 130 may define a set screw cradle 142 (see FIGS. 6 and 8) that aligns the set screw 144 with the mounting channel 138. The cable support member 104 is secured and released at a particular axial position along the cross-member 102 by tightening and loosening the set screw 144, respectively.

Figure 11:
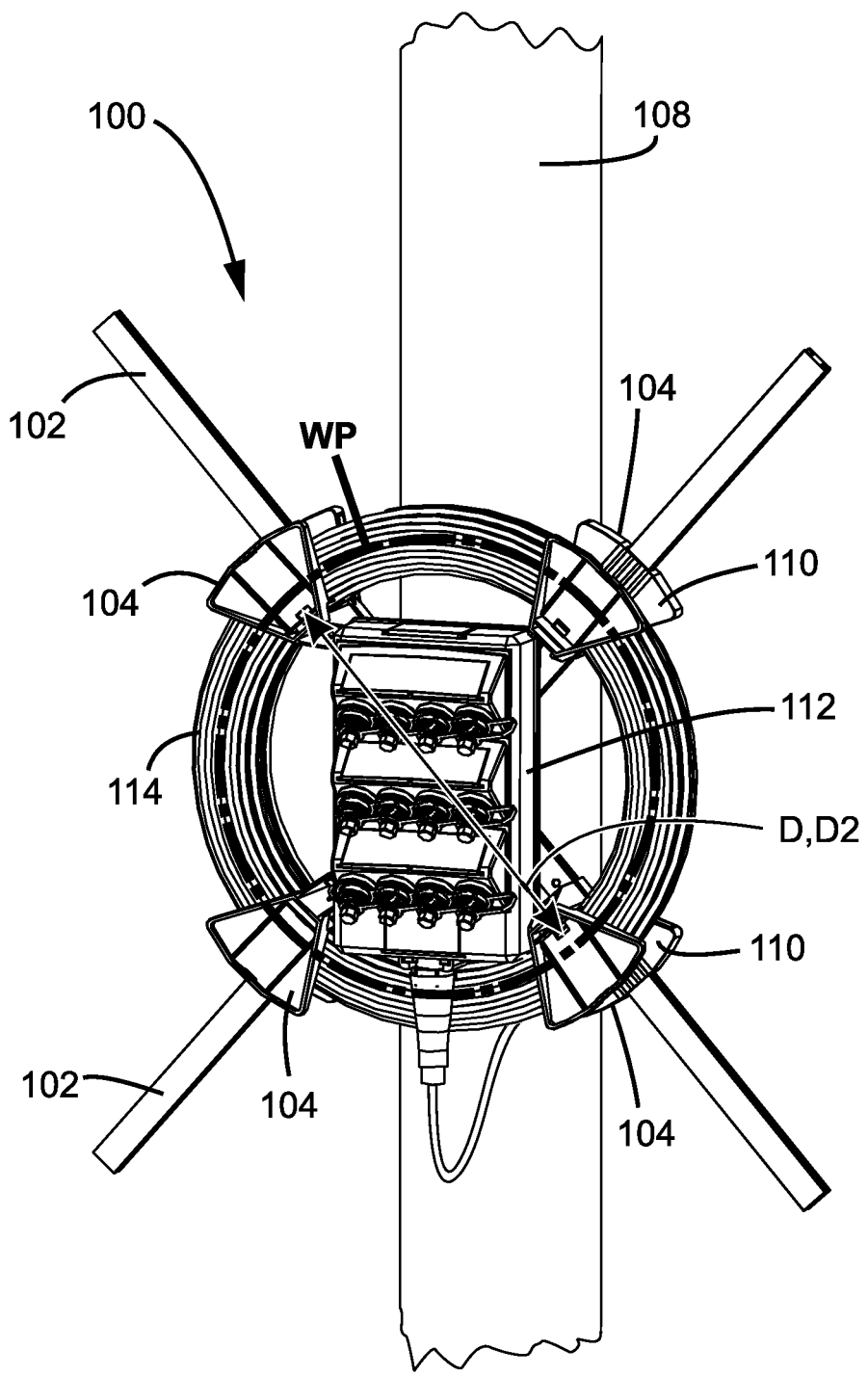
FIG. 11 is a perspective view of the example cable management system of FIG. 1 with the cable support members moved radially inwardly towards the enclosure to reduce a diameter of the cable winding path.
Figure 12:
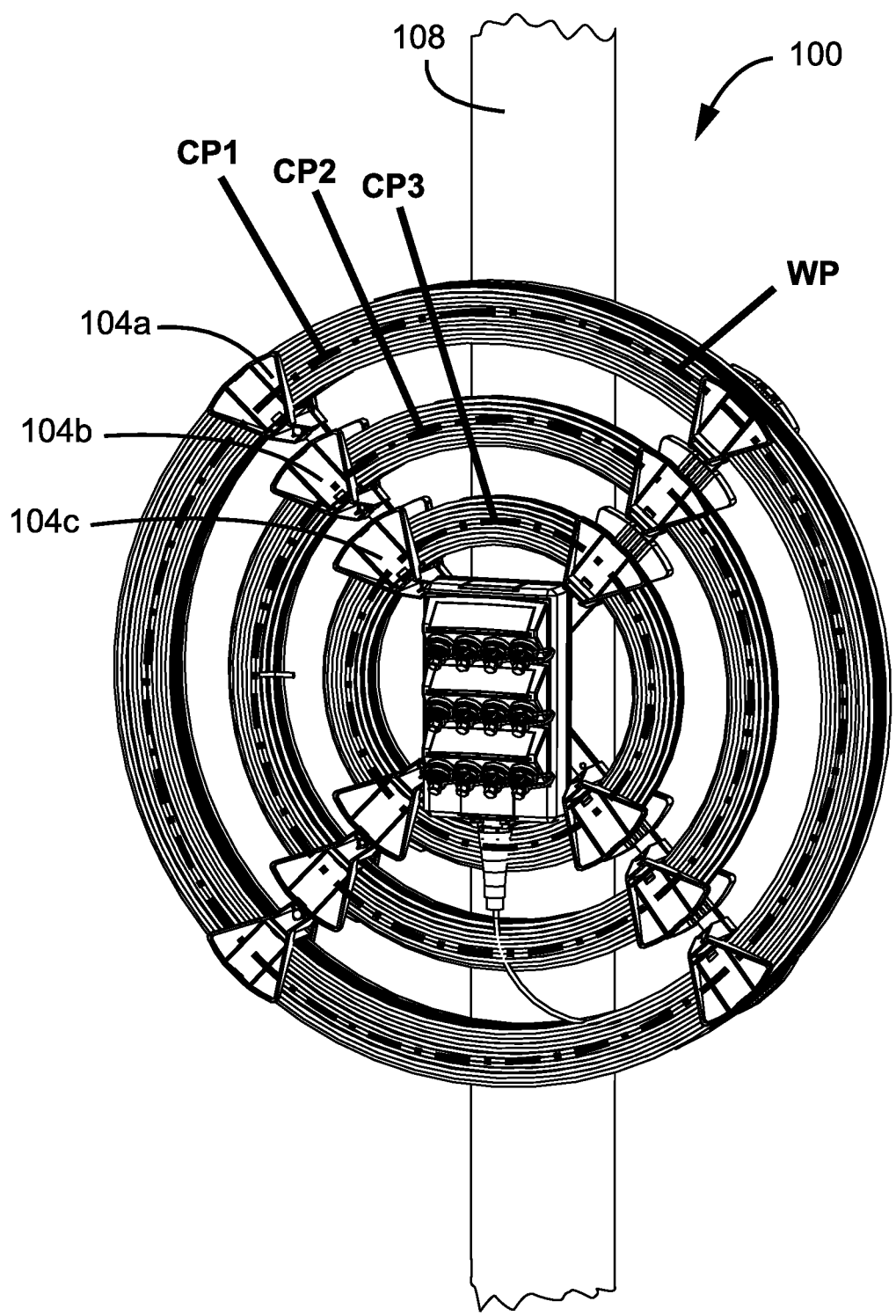
FIG. 12 is a perspective view of the example cable management system of FIG. 1 with additional cable support members mounted in layers along the cross-members to define multiple coil paths along the cable winding path.
Figures 13, 14:
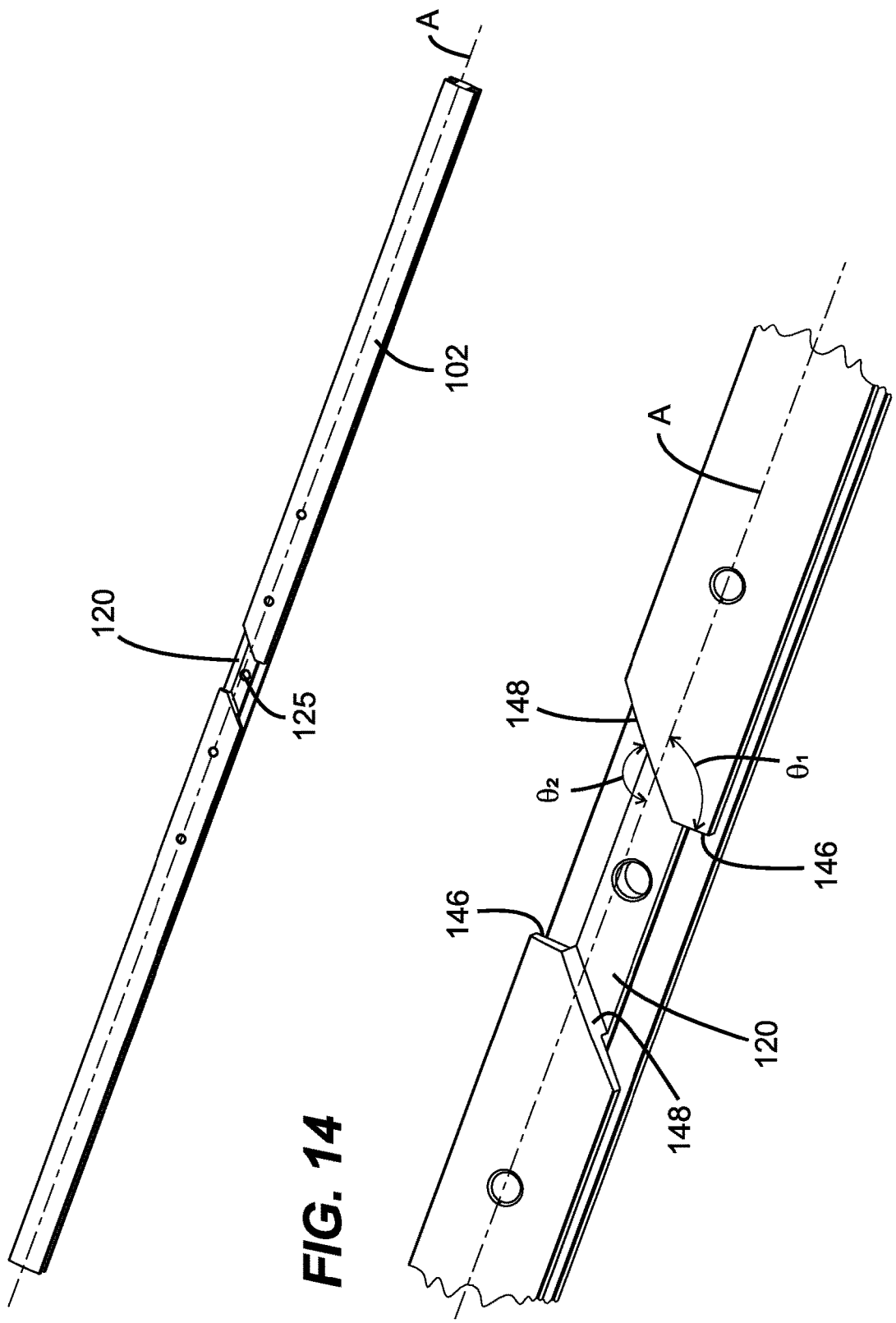
FIG. 13 is a front perspective view of the cross-member of FIG. 3.
FIG. 14 is an enlarged view of a recessed portion of the cross-member of FIG. 13.
Figure 15:
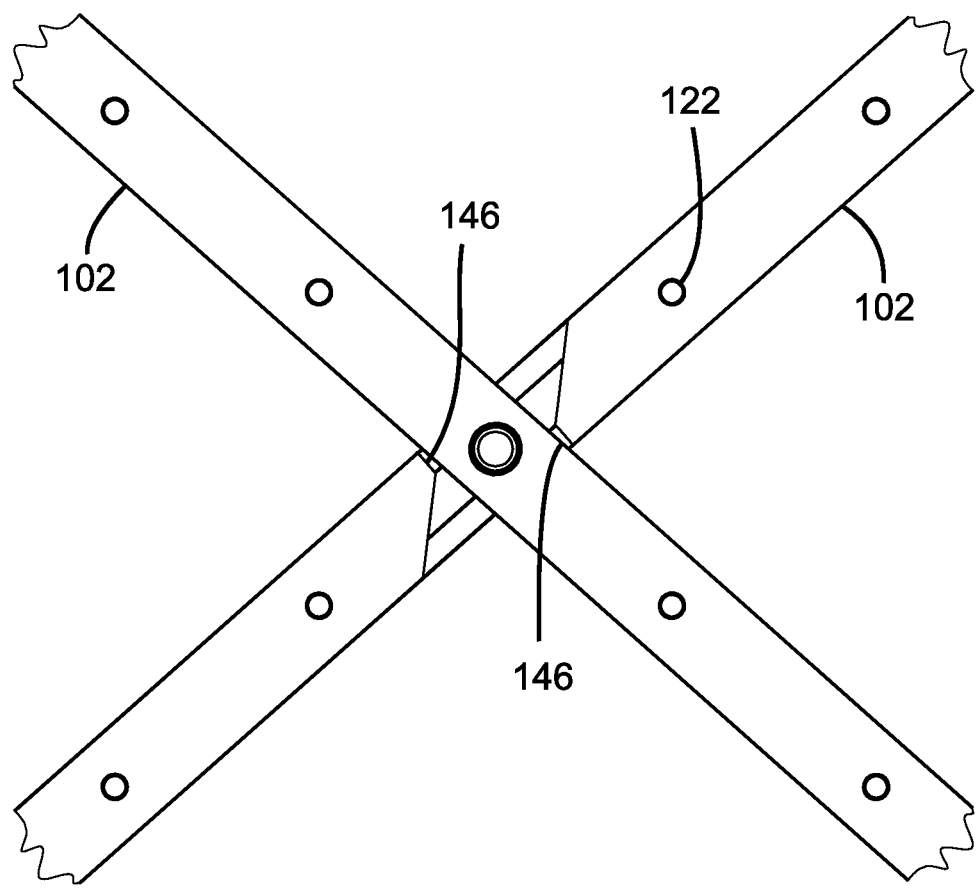
FIG. 15 illustrates two cross-members mated together in a first angular position relative to each other.
Figure 16:
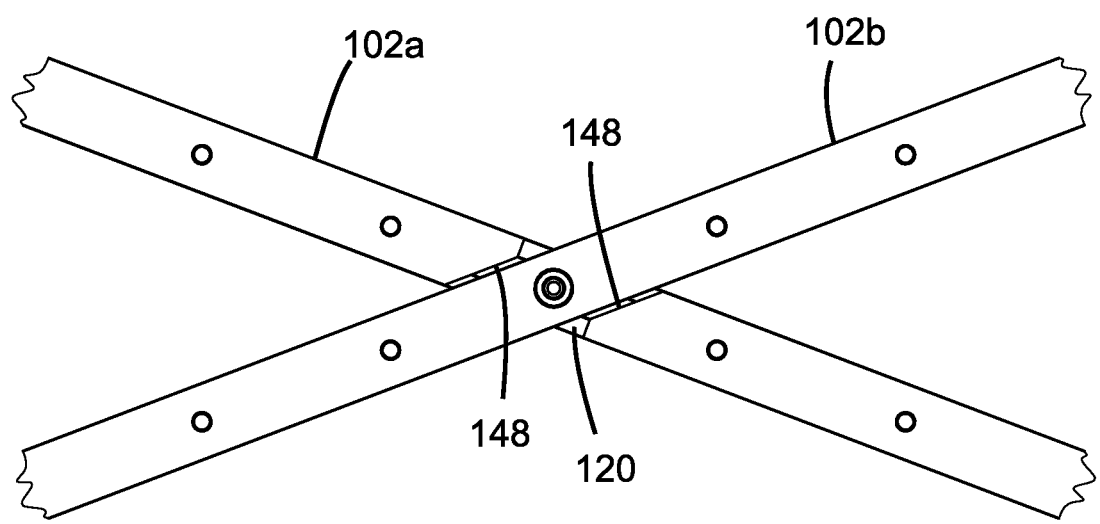
FIG. 16 illustrates two cross-members mated together in a second angular position relative to each other.

FIGS. 11 and 12 illustrate the advantages of allowing the cable support members 104 to be mounted at various axial positions along the cross-members 102. In FIG. 11, the cable support members 104 are disposed at radially inwardly positions along the cross-members 102 compared to the configuration shown in FIG. 1. Accordingly, the transverse cross-dimension D, D2 of the winding path WP is reduced compared to the transverse cross-dimension D, D1 of the winding path WP provided by cable support members 104 at the axial ends 128 of the cross-member 102. The reduced transverse cross-dimension D, D2 shortens the winding path WP, thereby accommodating shorter excess cable lengths. Accordingly, the cable management system 100 can accommodate cables of a wide range of lengths at the pole 108 or other mounting location.

As shown in FIG. 12, multiple cable support members 104 facing in a common direction can be mounted to the same cross-member 102. Accordingly, the cable management system 100 can define multiple layers or coil paths of the winding path WP. In the depicted example, the winding path WP includes first, second, and third coil paths CP1, CP2, CP3 each defined by a separate layer of cable support members 104. The cable support members 104 of each layer are disposed at a common axial distance along the cross-member 102 from the intermediate location 125 of the cross-member 102.

Referring now to FIGS. 13-16, the relative position of the cross-members 102 relative to each other can be adjusted to further modify the size and/or shape of the winding path WP. For example, the cross-members 102 may be adapted to fit together in either of two or more configurations (compare FIGS. 15 and 16). In certain implementations, the recess 120 defined in each cross-member 102 is shaped to facilitate stable engagement of the cross-members 102 in each configuration. In the example depicted in FIG. 14, each recess includes a first pair of opposing surfaces 146 extending at a first angle θ1 to a longitudinal axis A, which extends along the length L of the cross-member 102, and a second pair of opposing surfaces 148 extending at a second angle θ2 to the longitudinal axis X. When mated together in a first configuration, the surfaces 146 of a first cross-member 102a engage the surfaces 146 of a second cross-member 102b (see FIG. 15). When mated together in a second configuration, the surfaces 148 of the first cross-member 102a engage the surfaces 148 of the second cross-member 102b (see FIG. 16).

Figure 17:
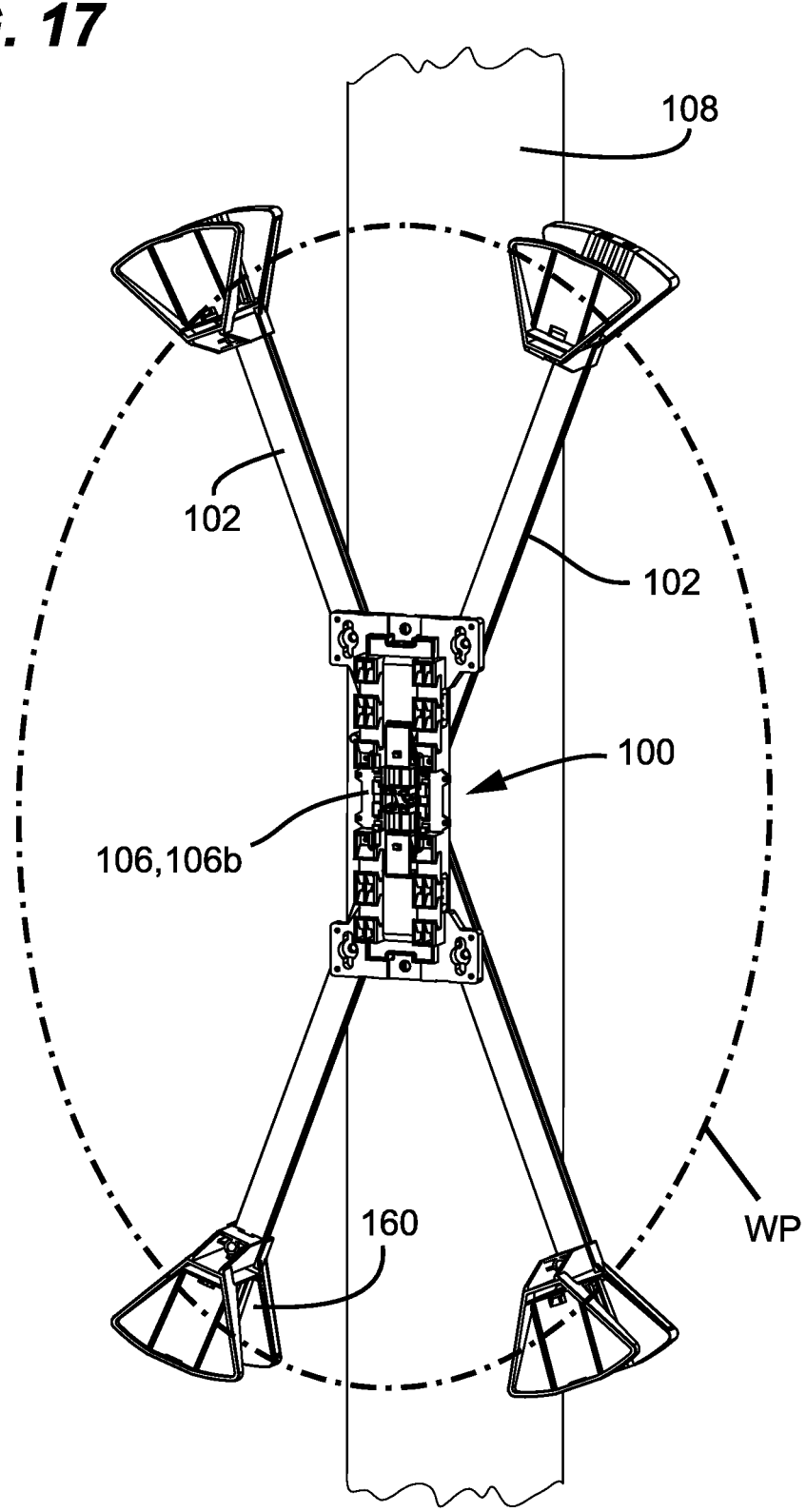
FIG. 17 is a perspective view of the cable management system of FIG. 1, except that the cross-members are held in a second configuration with a second type of mounting bracket to provide a differently shaped cable winding path.
Figure 18:
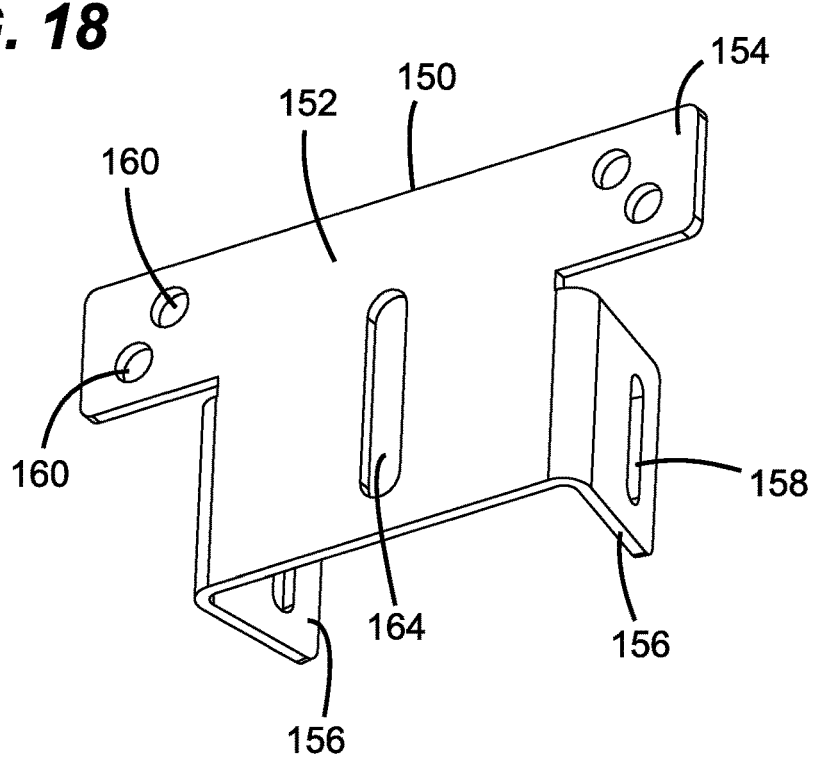
FIGS. 18 and 19 are perspective views of an example bracket member of a mounting bracket suitable for use with the framework and cable support members of FIG. 1, the bracket member being configured to cooperate with another such bracket member to form a third example mounting bracket for use with the framework of cross-members.
Figure 19:
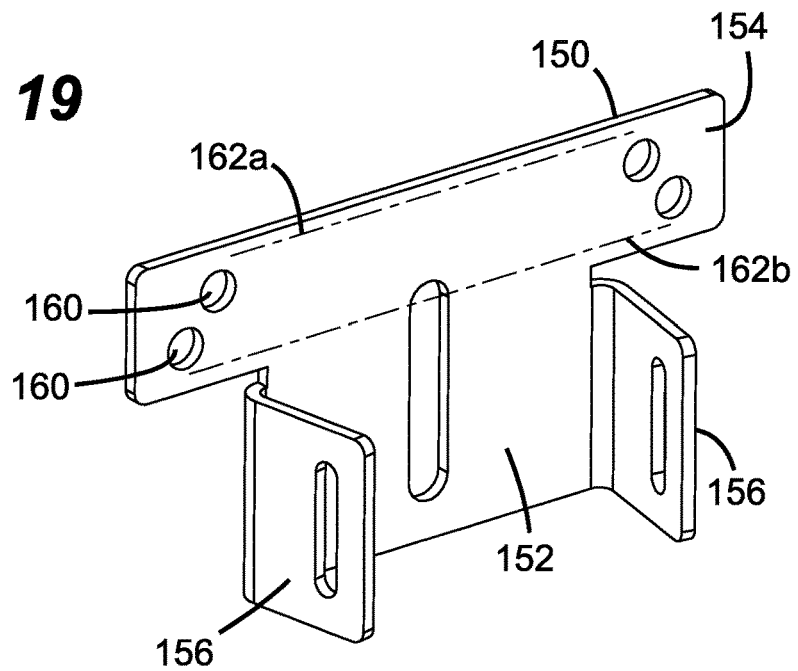

Referring to FIGS. 1 and 17-21, the cross-members 102 can be held in either configuration using any of a variety of mounting brackets 106. In some implementations, the mounting bracket 106 is configured to hold the cross-members 102 in a particular configuration. For example, FIG. 1 shows a first example type 106a of mounting bracket 106 that holds the cross-members 102 in the first configuration; FIG. 17 shows a second example type 106b of mounting bracket 106 that holds the cross-members 102 in the second configuration. In some examples, different types 106a, 106b of mounting bracket 106 are configured to hold different types, sizes, or shapes of enclosures 112. In other implementations, different types 106a, 106b of mounting brackets 106 are configured to form winding paths of different shapes and/or lengths. For example, the winding path WP of FIG. 17 is shaped to have a longer cross-dimension in a vertical direction and a smaller cross-dimension in a horizontal direction compared to the winding path WP of FIG. 1. Accordingly, the configuration of the cable management system 100 shown in FIG. 17 could fit better in a narrow space than the configured shown in FIG. 1 while the configuration shown in FIG. 1 could fit better is a shorter space than the configuration shown in FIG. 17.

FIGS. 18-21 illustrate a third type 106c of mounting bracket 106 that can accommodate both configurations of the cross-members 102. The mounting bracket 106c includes first and second bracket members 150 that cooperate to hold the cross-members 102 in the desired configuration. For example, a first bracket member 150 can be attached to first and second cross-members 102 at one side of the intermediate location 125 and a second bracket member 150 can be attached to the first and second cross-members 102 at an opposite side of the intermediate location 125. The bracket members 150 may cooperate to define a mounting surface at which the enclosure 112 can mount.

Each bracket member 150 includes a main body 152 having first and second cross-member attachment regions 154. In certain examples, the first and second cross-member attachment regions 154 are disposed at opposite sides of the main body 152. In the depicted example, the cross-member attachment regions 154 are disposed at wings extending laterally outwardly from the main body 152. Each cross-member attachment region 154 defines one or more fastener openings 160 for aligning with the fastener openings 122 of the cross-members 102.

In certain implementations, the cross-member attachment regions 154 defines multiple sets of fastener openings 160 with each set corresponding to one of the configurations for the cross-members 102. For example, a first set 162a of fastener openings 160 of the bracket member 150 may align with the first set 124a of fastener openings 122 of the cross-members 102 (e.g., see FIG. 20). A second set 162b of fastener openings 160 of the bracket member 150 align with the second set 124b of fastener openings 122 of the cross-members 102 (e.g., see FIG. 21). Fasteners F may extend through the aligned openings 160, 122 to hold the cross-members 102 to the bracket member 150, thereby maintaining the relative positions of the cross-members 102.

The bracket member 150 also is configured to mount the cross-members 102 to a pole 108 or other surface. For example, the main body 152 of each bracket member 150 may define an aperture 164 through which one or more fasteners B (e.g., bolts, screws, etc.) extend to secure the bracket member 150 to the pole 108 or other surface. In the depicted example, the aperture is elongate to provide flexibility for positioning the fastener at the pole 108.

Figure 20:
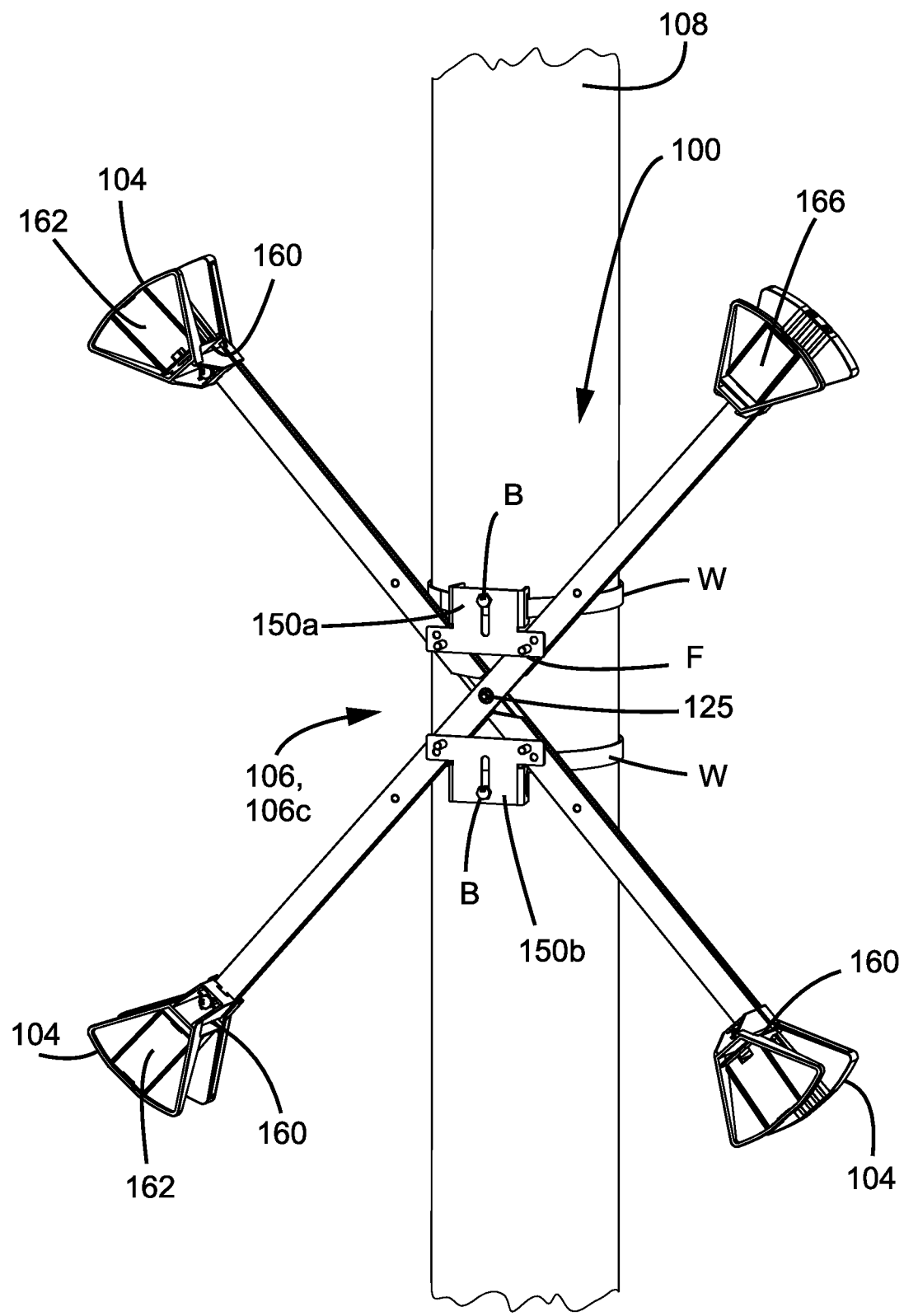
FIG. 20 is a perspective view of the example cable management system assembled in the first configuration using the pieces of the third mounting bracket of FIGS. 18 and 19.
Figure 21:
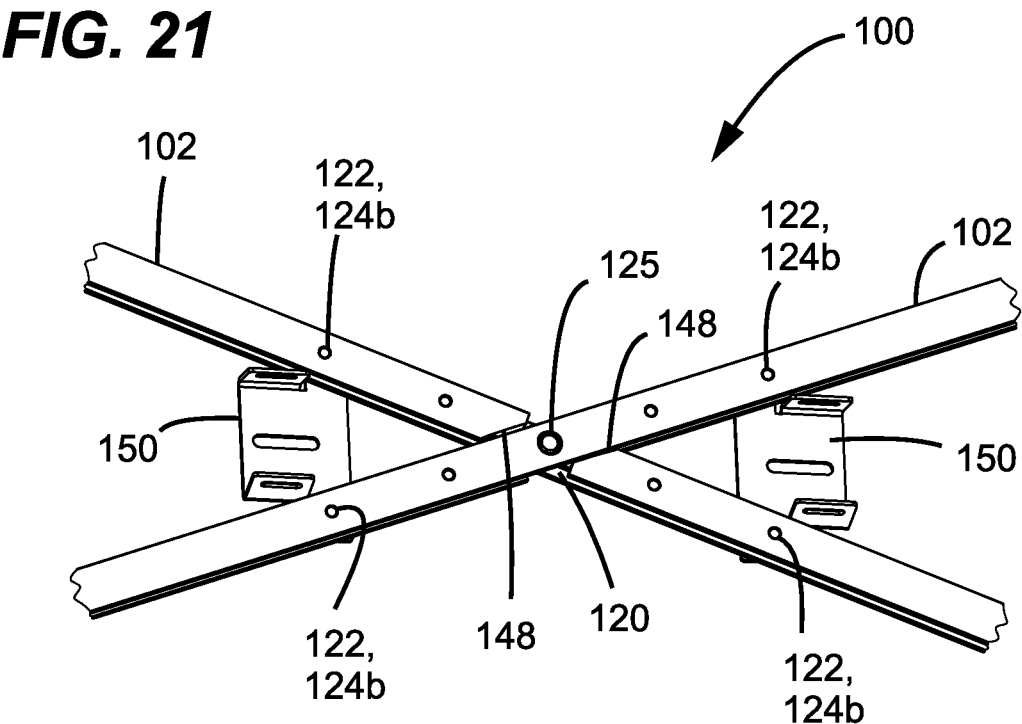
FIG. 21 is a perspective view of the example cable management system assembled in the second configuration using the pieces of the third mounting bracket of FIGS. 18 and 19.

In certain examples, the bracket member 150 includes strap mounting members 156 that enable the bracket member 156 to be attached to a pole 108 using a strap W (see FIG. 20). Each strap mounting member 156 defines an elongate slot 158 through which the strap W extends. In the depicted example, the strap mounting members 156 include flanges cantilevered (e.g., bent back) from the main body 152 of the bracket member 150.

Figure 22:
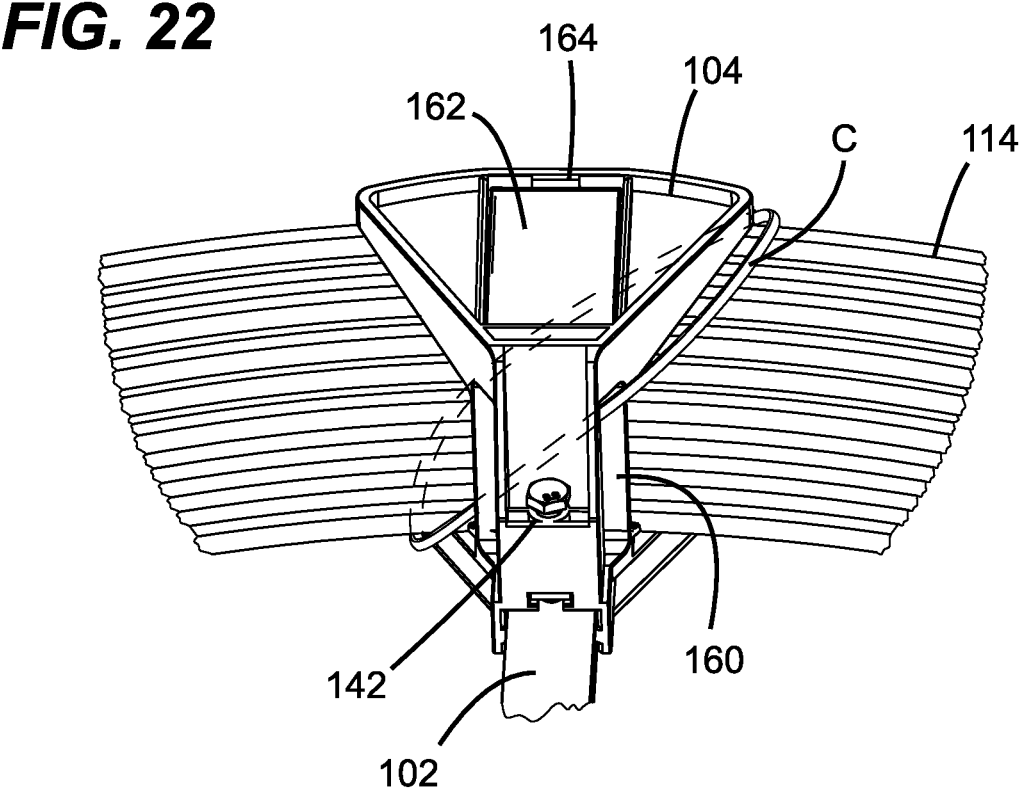
FIG. 22 is a perspective view of a cable wound in coils through a cable support member and a cable tie securing the same.
Figure 23:
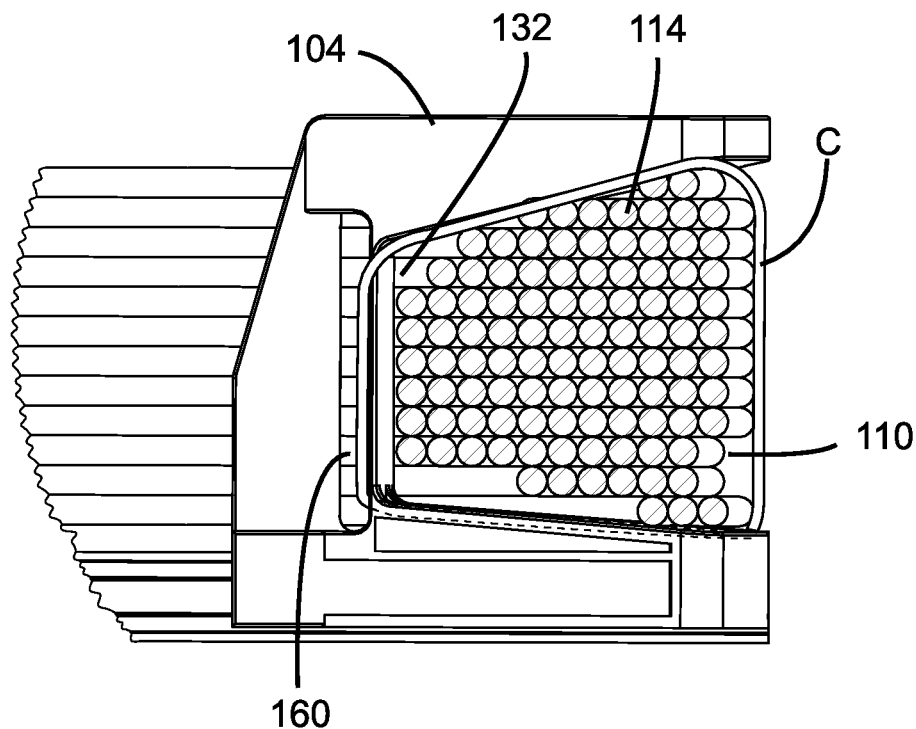
FIG. 23 is a transverse cross-section of the cable support member, cables, and cable tie shown in FIG. 22.
Figure 24:
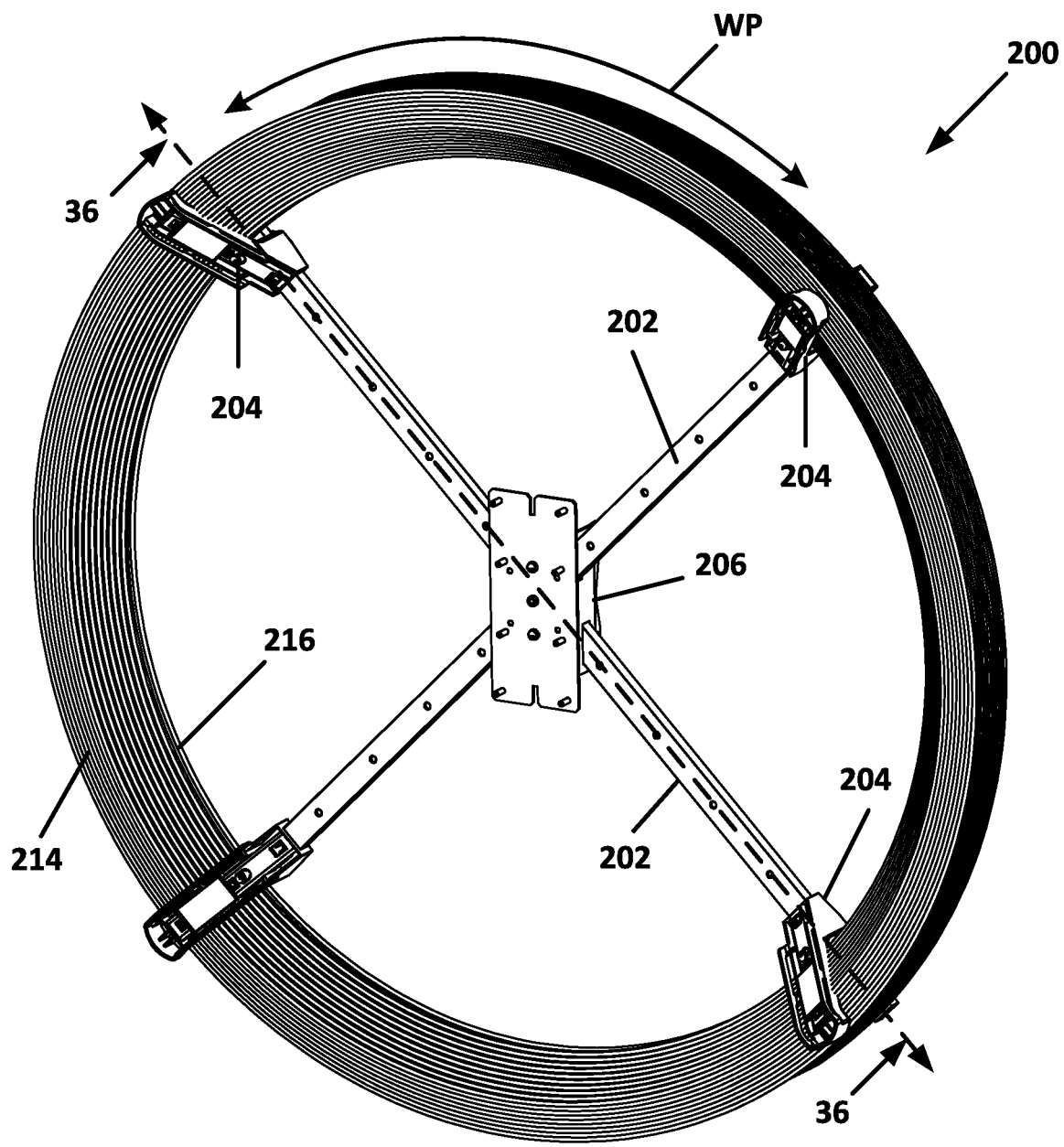
FIG. 24 is a front perspective view of a second cable management system configured in accordance with the principles of the present disclosure, the second cable management system including a framework of cross-members configured to couple to a another example mounting bracket, the second cable management system also including cable support members mounted to the cross-members to define a winding path.
Figure 25:
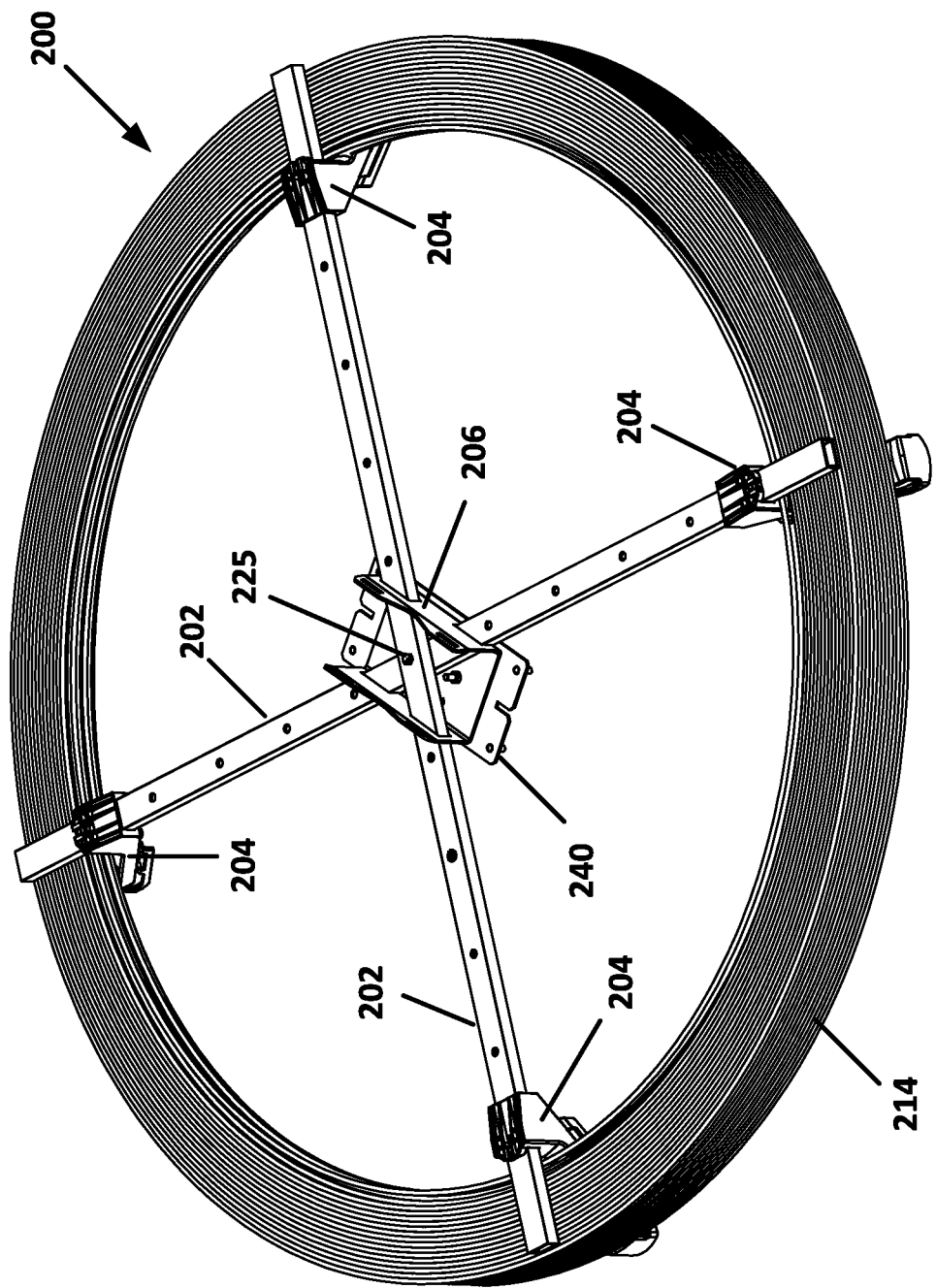
FIG. 25 is a rear perspective view of the second cable management system of FIG. 24.

Referring to FIGS. 22 and 23, the cable coils routed along the winding path WP can be held together using one or more cable ties C. In certain implementations, each cable support member 104 defines a through-passage 160 through which a cable tie C can extend when the cable tie C is wrapped around the coils of cable 114 retained at the channel 110 of the cable support member 104. In some examples, cable ties C are provided at each cable support member 104. In other examples, one or more cable ties C are provided at a subset of the cable support members 104. In certain implementations, the through-passage 160 is oriented to extend circumferentially through the cable support member 104 generally parallel with the guide channel 110. The term "generally" is used to account for the curve of the guide channel 110 to provide bend radius protection for the cables 114. In an example, the through-passage 160 extends between the fastener cradle 142 and the cable support surface 132.

A cable tie C can be wrapped diagonally around the cable coils and through the through-passage 160 (e.g., see FIG. 22). For example, the cable tie C may be inserted along the through-passage 160 so that opposite ends of the cable tie C are disposed at opposite sides of the cable support member 104. One end of the cable tie C is wrapped beneath the cable coils at one side of the cable support member 104 and the opposite end of the cable tie C is wrapped over the cable coils at the other side of the cable support member (see FIG. 22). The ends of the cable tie C are coupled together (e.g., latched, tied, etc.) at an outer side of the cable coils. Alternatively, the cable tie C can be positioned so that the ends are coupled together at any point around the coils. In certain examples, a second cable tie C can be wrapped diagonally around the cable coils in the opposite direction (e.g., wrapped over the cable 114 where the first cable tie C is wrapped beneath and vice versa).

In certain implementations, each of the cable support members 104 is configured to receive indicia (e.g., a label). The indicia may provide information about the cable 114 (e.g., network provider, cable type, fiber count, etc.), the enclosure 112 (e.g., enclosure identification number, network identification number, network provider, type of enclosure, port count, etc.), and/or the installation location 108 (e.g., a network identification, a network node identification, an associated network provider, etc.). In certain examples, the indicia is provided at only a selected one of the cable support members 104 at each installation location 108.

Referring back to FIG. 3, in certain implementations, each cable support member 104 includes a label cradle 162 recessed into a front of the cable support member 104. A label (e.g., a surface bearing indicia such as text, barcode, QR code, etc.; an RFID tag; a color-coded tag; etc.) can be disposed within the cradle 162. In some implementations, a cap 166 is mounted to the cable support member 104 to enclose and hold the label within the cradle 162. In other implementations, the label itself secures to the cradle 162 without a cap. In certain examples, the label cradle 162 includes attachment structure 164 (FIG. 7) to which the label and/or cap 166 couple. For example, the attachment structure 164 may include catch surfaces to which tabs of the label or cap may snap-fit or otherwise engage.

Referring now to FIGS. 24-36, the second cable management system 200 includes cross-members 202 each defining a row of apertures 222 along a length thereof. In some implementations, the cross-members 202 are connected together by aligning one of the fasteners 222 of a first of the cross-members 202 with one of the apertures 222 of a second of the cross-members 202 and inserting a fastener 225 therethrough. The fastener 225 also extends through an aperture 235 defined in a mounting surface 230 of the mounting bracket 206. Any of the apertures 222 of the first cross-member 202 can be aligned with any of the apertures 222 of the second cross-member 202. Accordingly, the cross-members 202 can be connected together in any of a variety of configurations (e.g., compare FIGS. 24, 27, and 28).

In some examples, the first and second cross-members 202 are mounted to extend symmetrically along a major axis M (FIG. 30) and/or along a minor axis I (FIG. 30) of the mounting bracket 206. For example, in FIG. 25, the middle apertures 222 of the cross-members 202 are aligned and connected with a fastener 225. In other examples, the first and second cross-members 202 can be mounted asymmetrically along the major axis M and/or along the minor axis I. For example, in FIG. 29, the cross-members 202 are positioned so that a larger length of each cross-member 202 extends from the crossing in a first direction from the minor axis I than in an opposite second direction from the minor axis I. Accordingly, depending on the orientation of the cable mounting system 200, the mounting bracket 206 can be disposed closer to a floor, ceiling, wall, or other structure that would otherwise have interfered with cable storage if the cross-member axial ends had been mounted equidistant from the crossing.

Figure 26:
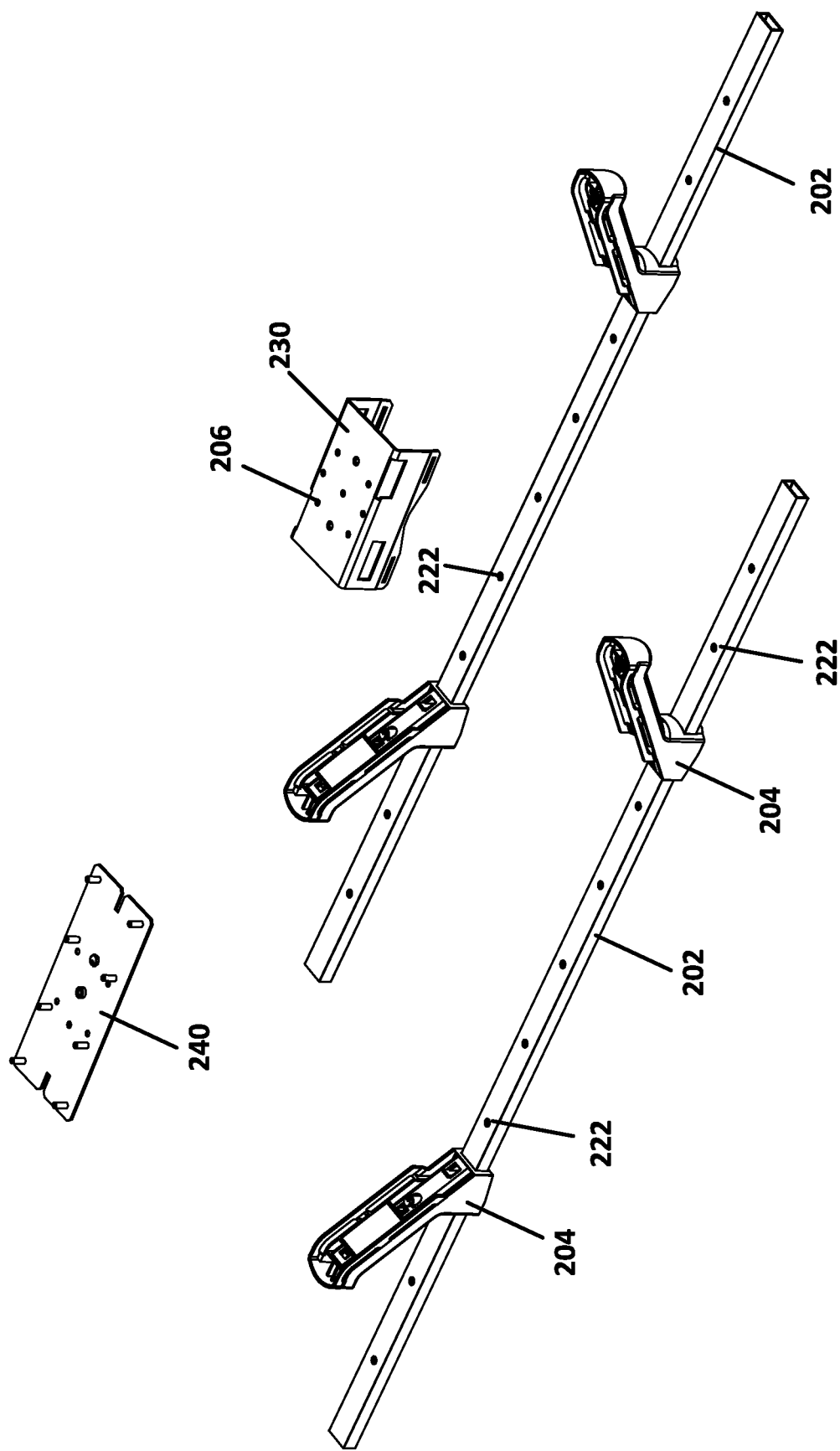
FIG. 26 illustrates the components of the second cable management system of FIG. 24.
Figure 27:
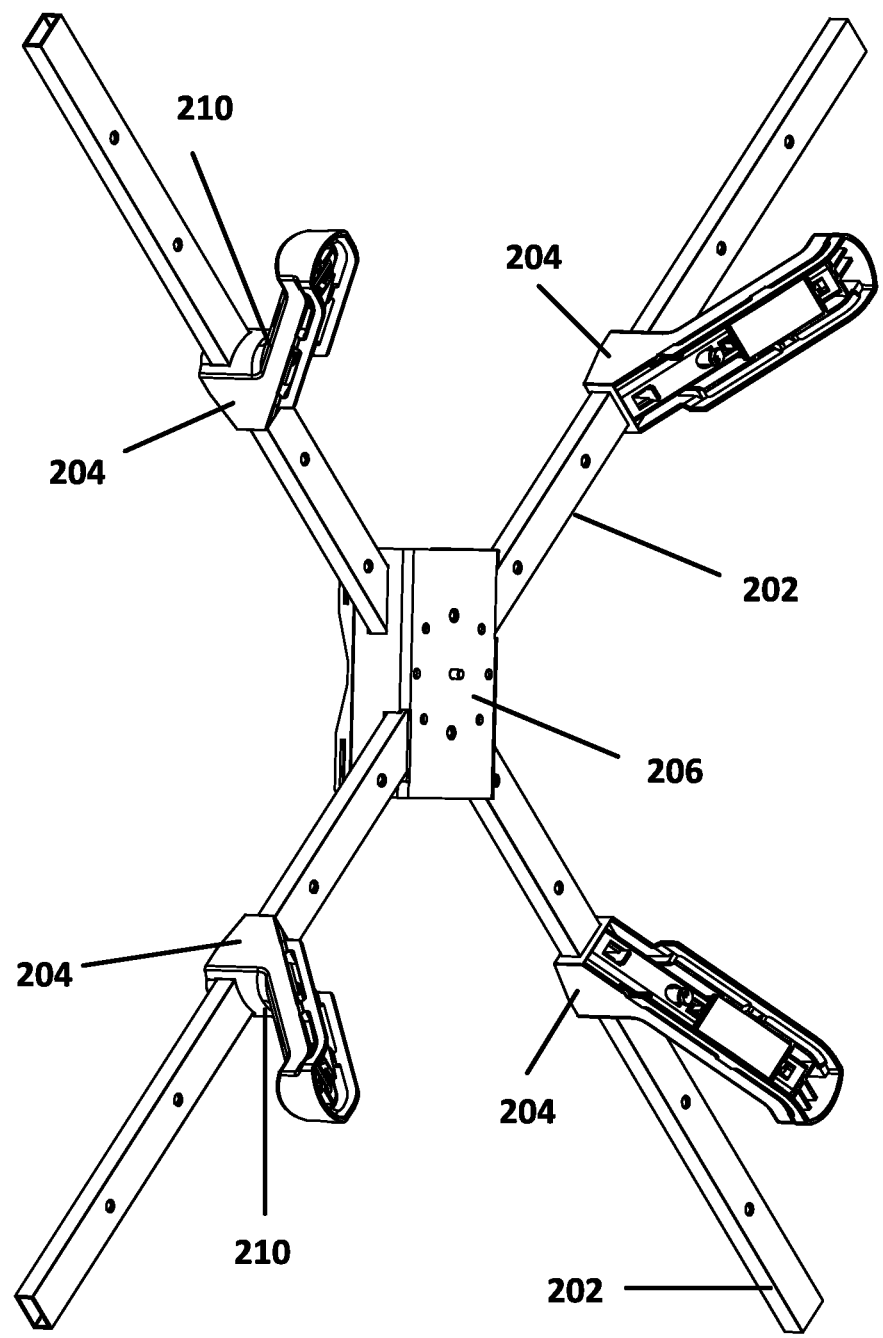
FIG. 27 is a front perspective view of the second cable management system of FIG. 24 with a bracket adapter removed and the cable support members moved radially inset positions along the cross-members.
Figure 28:
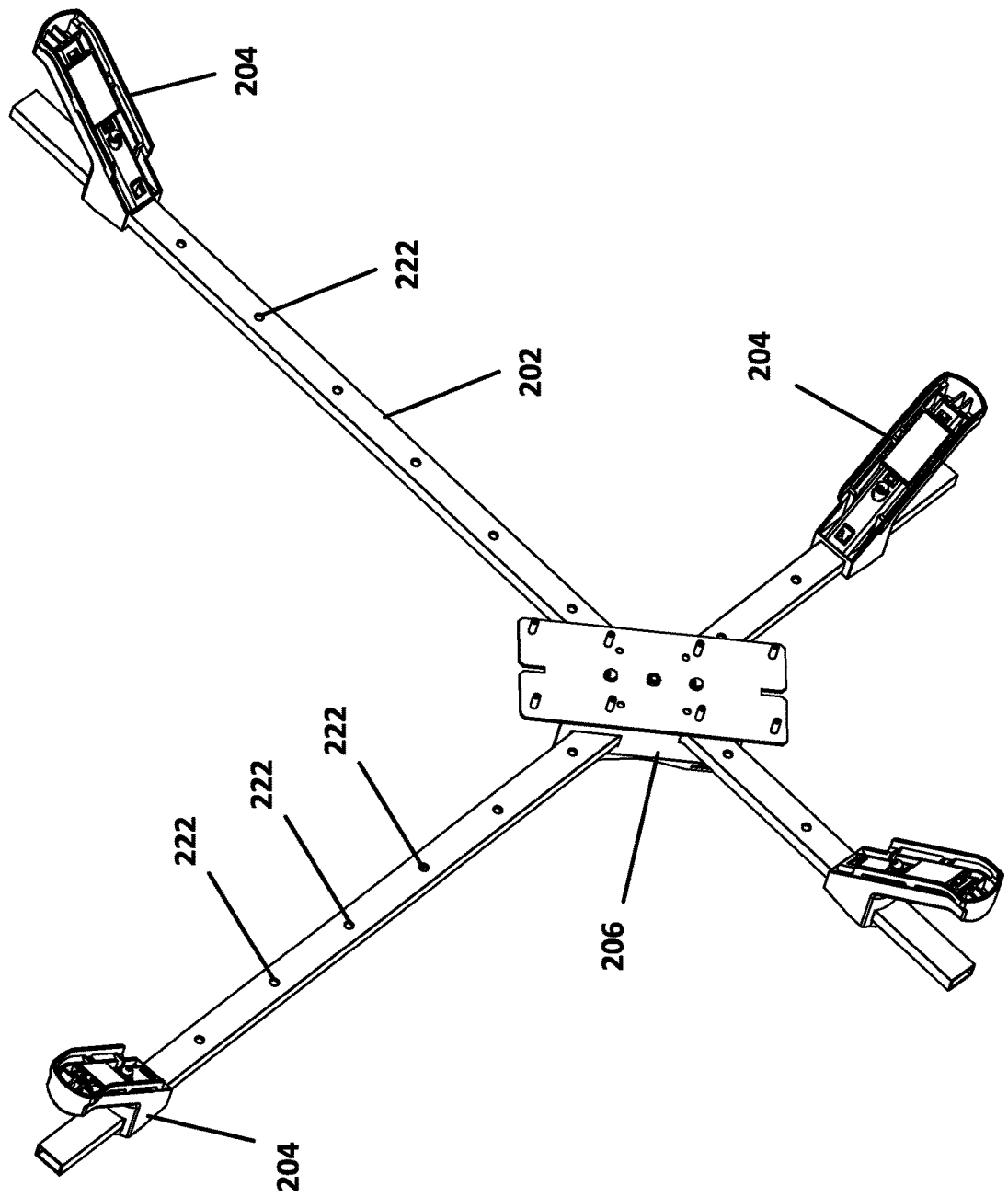
FIG. 28 is a front perspective view of the second cable management system of FIG. 24 with the cross-members arranged in an asymmetrical configuration about the minor axis of the mounting bracket.
Figure 29:
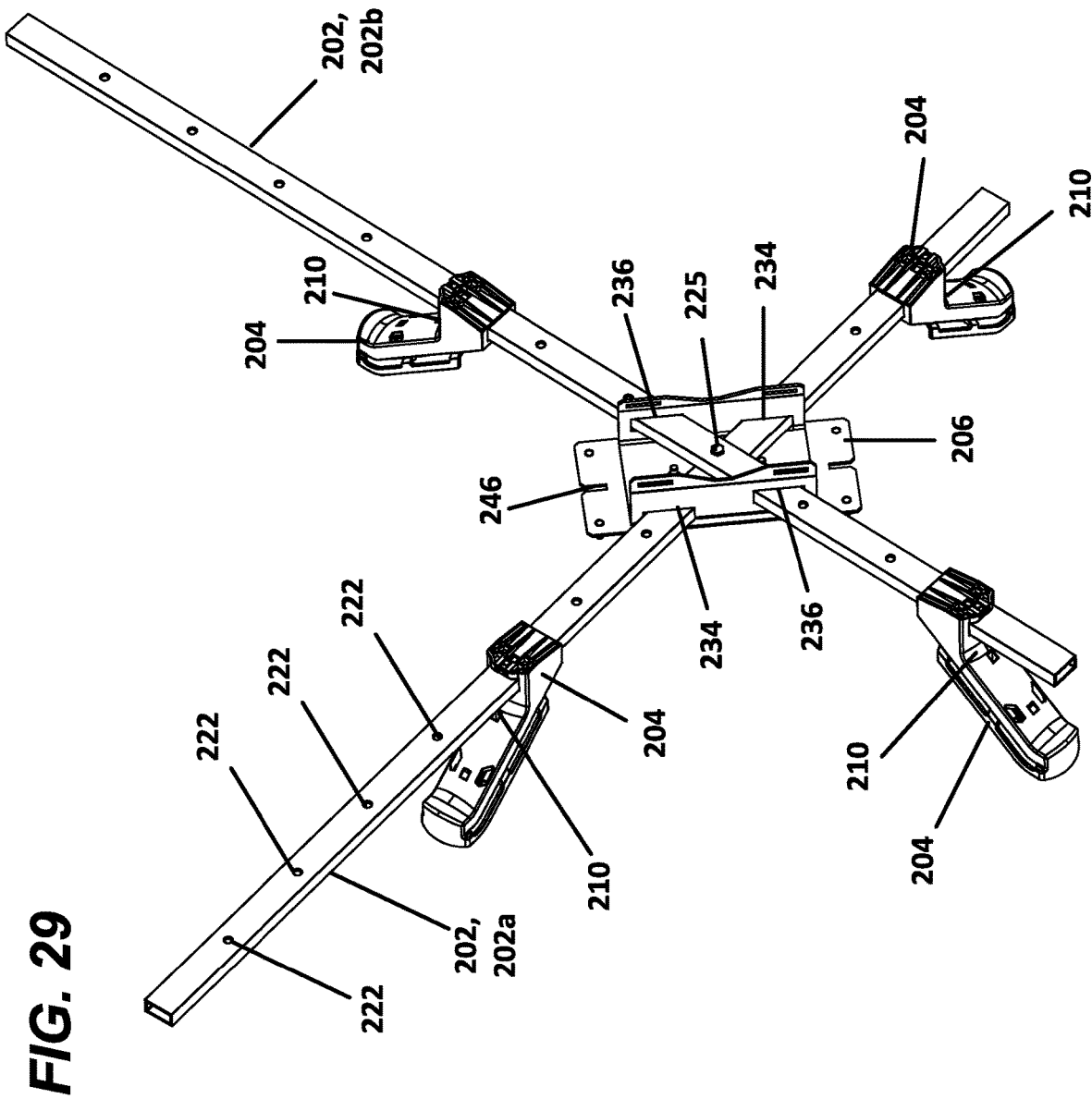
FIG. 29 is a rear perspective view of the second cable management system of FIG. 28 with the cable support members moved to different positions along the cross-members.
Figure 30:
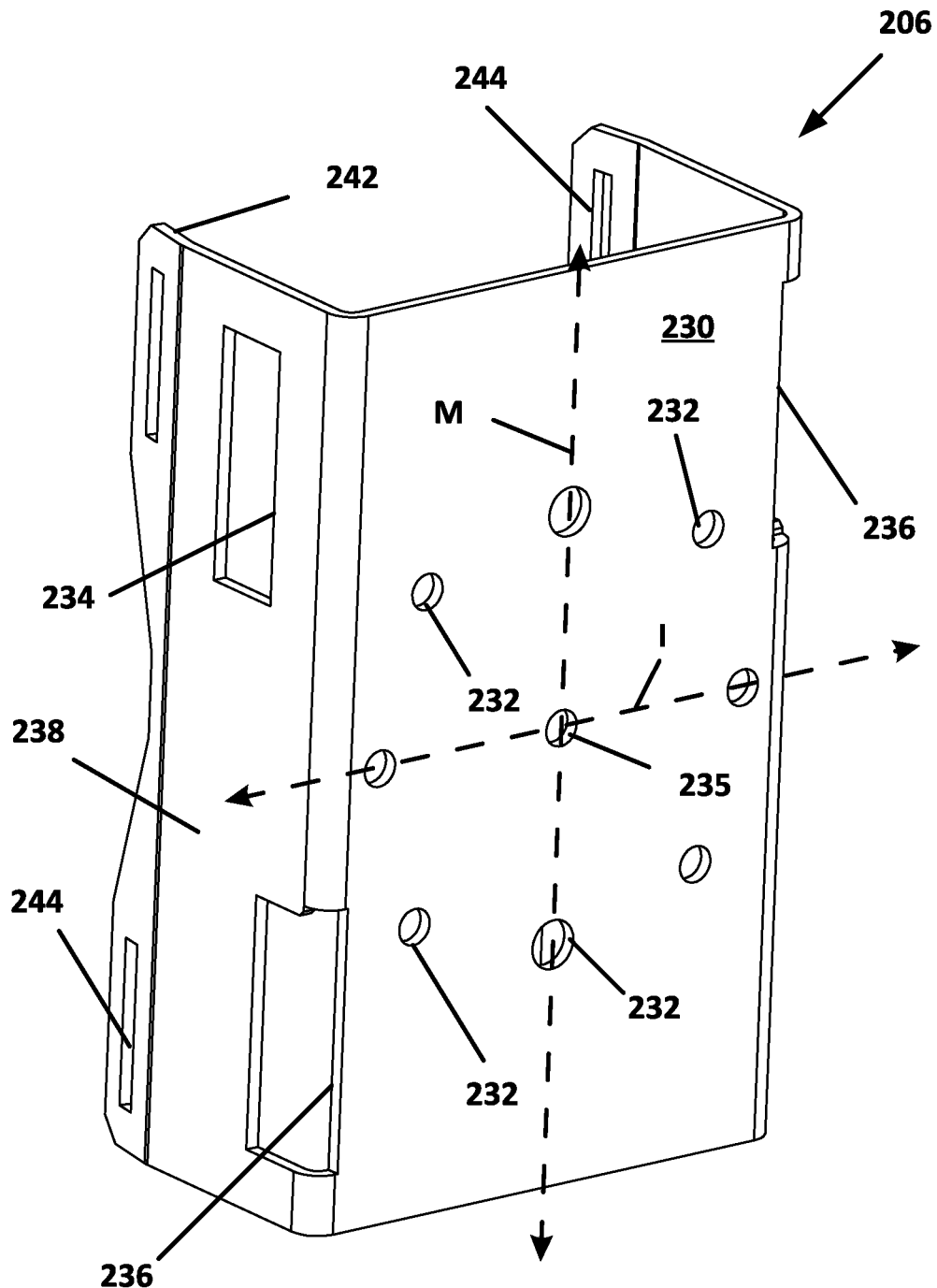
FIG. 30 is a front perspective view of an example mounting bracket suitable for use with the second cable management system of any of FIGS. 24-29.
Figure 31:
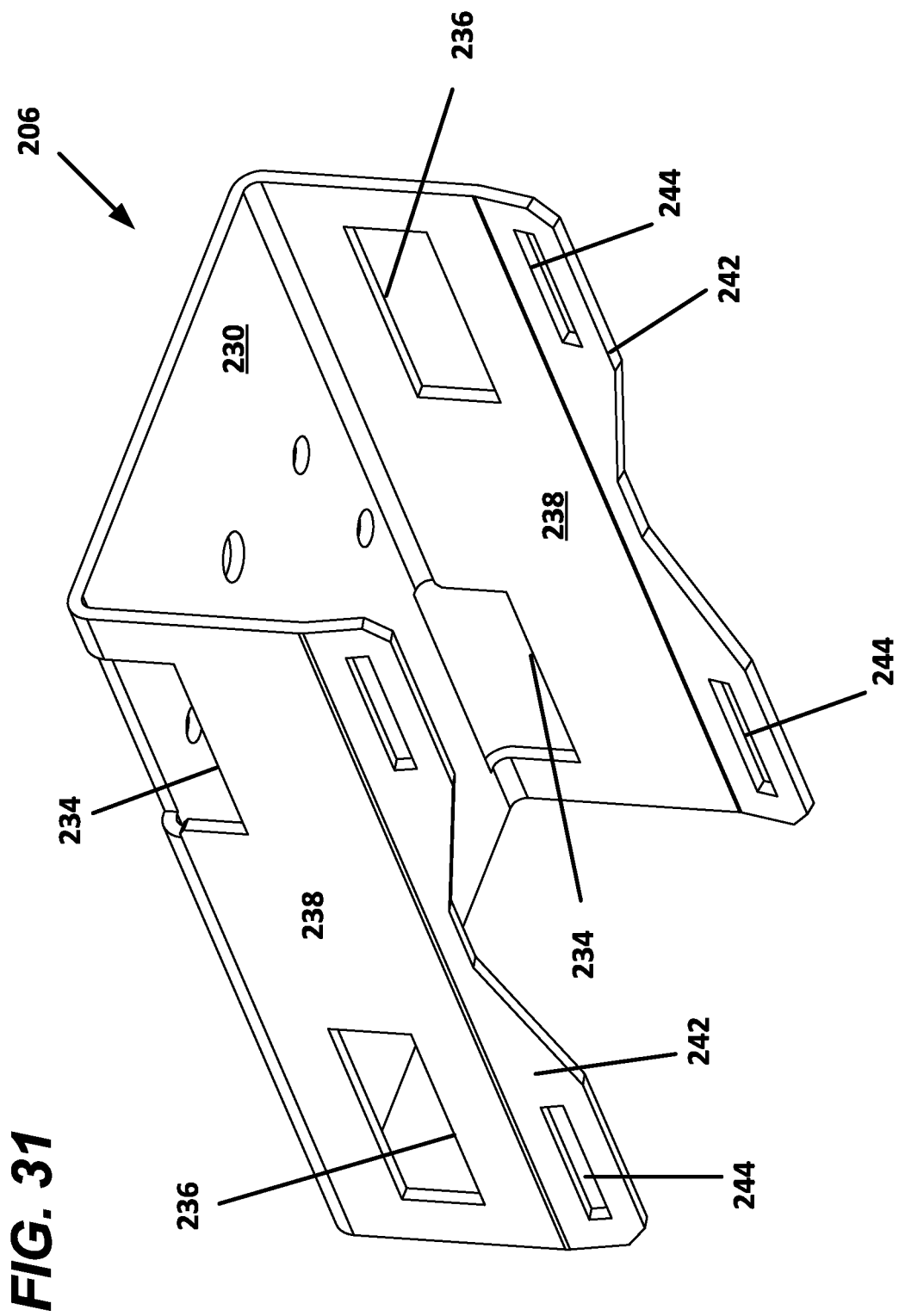
FIG. 31 is a rear perspective view of the mounting bracket of FIG. 30.
Figure 32:
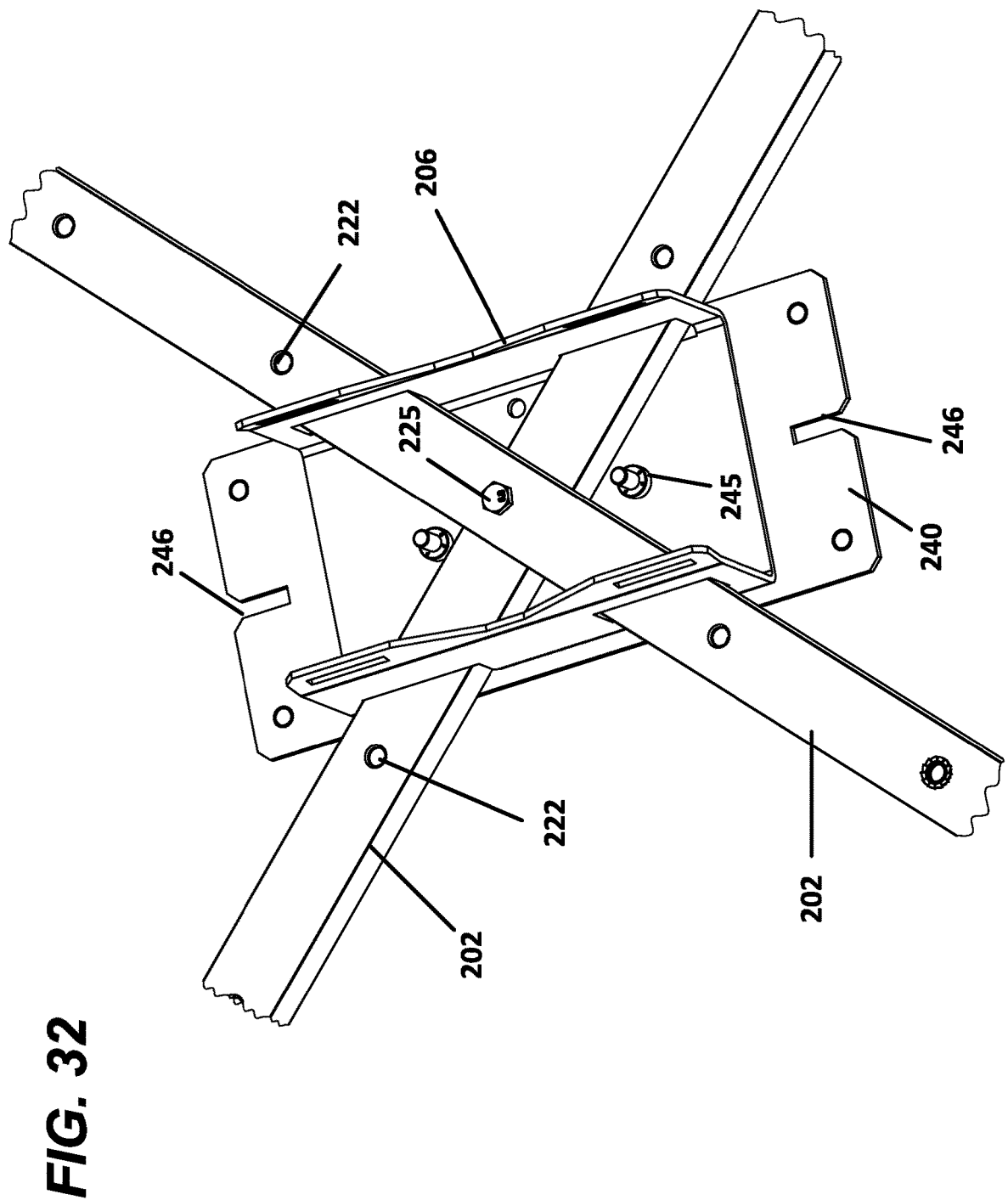
FIG. 32 is a rear perspective view of the mounting bracket of FIG. 30 with first and second cross-members secured thereto.
Figure 33:
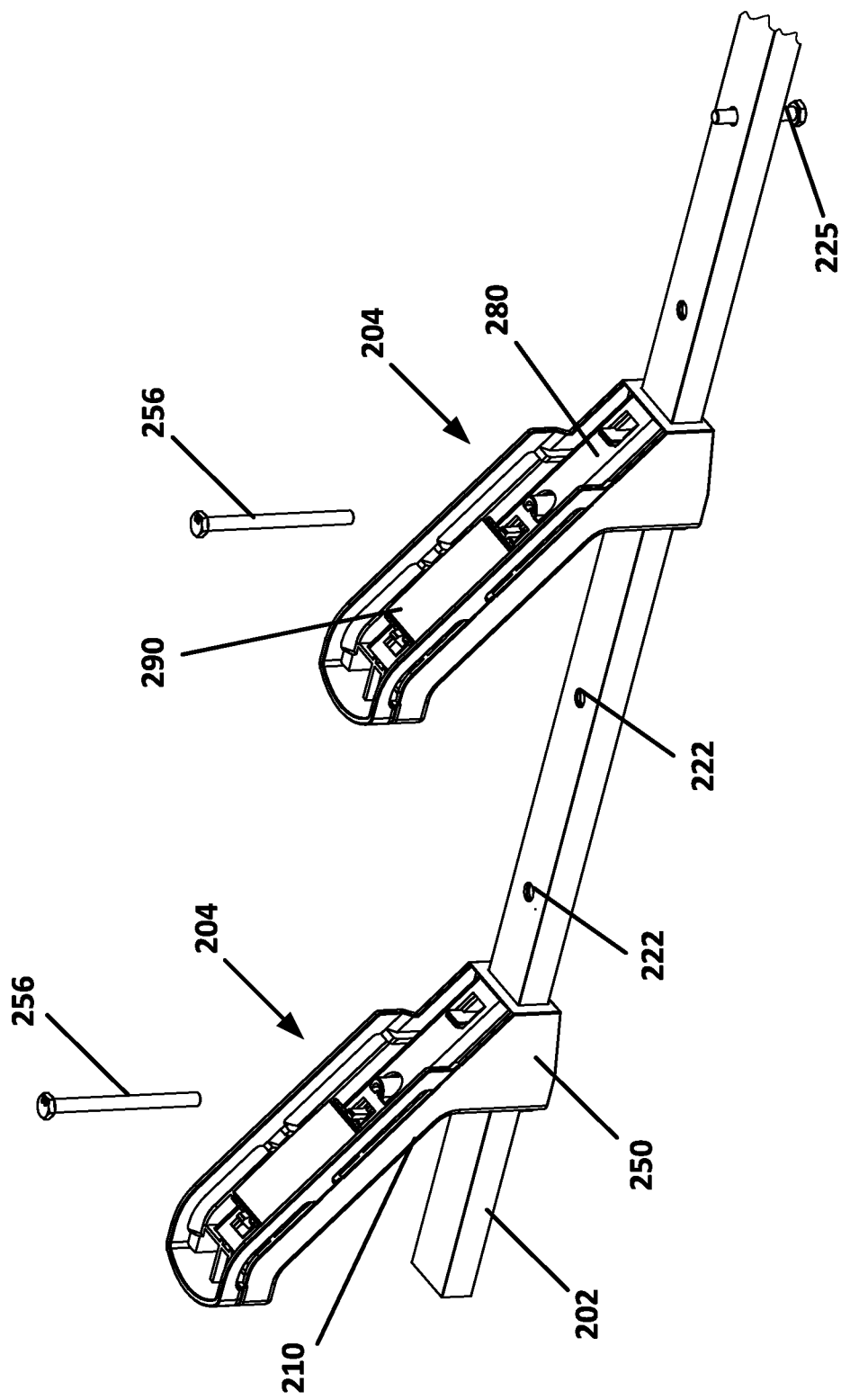
FIG. 33 shows a first cable support member being secured at a first position along a cross-member and a second cable support member being secured at a second position along the cross-member, the second cable support member carrying an optional stiffening member and an optional label.

FIG. 26 shows the mounting bracket 206 exploded away from the first and second cross-members 202. Cable support members 204 are shown mounted to the cross-members 202. In some implementations, the mounting bracket 206 is configured to directly receive the terminal (e.g., terminal 112). For example, the mounting bracket 206 includes a surface 230 that extends along the major and minor axes M, I of the mounting bracket 206 (e.g., see FIG. 30). The surface 230 defines one or more apertures 232 at which fasteners can extend to mount the terminal to the surface 230. In other implementations, a bracket adapter 240 is configured to attach the terminal to the mounting bracket 206 (e.g., see FIG. 24). The bracket adapter 240 has a first interface configured to secure to the mounting bracket 206 and a second interface configured to secure to the terminal. In certain examples, the bracket adapter 240 is disposed at the mounting surface 230 and fasteners 245 (FIG. 32) pass through respective apertures in the bracket adapter 240 and one or more of the apertures 232 of the mounting surface 230 to secure the bracket adapter 240 to the mounting bracket 206.

In certain examples, each cross-member 202 passes through a respective pair of apertures defined in the mounting bracket 206 to help support the cross-members 202. The mounting bracket 206 defines a first pair of apertures 234 offset from each other along the major axis M and offset from each other along the minor axis I. Accordingly, a first cross-member 202a extends through the apertures 234 at an angle relative to the major and minor axes M, I. The mounting bracket 206 also defines a second pair of apertures 236 offset from each other along the major axis M and offset from each other along the minor axis I. A second cross-member 202b extends through the apertures 236 at an angle relative to the major and minor axes M, I.

In certain implementations, sidewalls 238 extend rearwardly from the mounting surface 230 to define the pairs of apertures 234, 236. In certain examples, each sidewall 238 defines one aperture of each pair 234, 236. In certain examples, the first pair of apertures 234 are located closer to the mounting surface 230 of the mounting bracket 206 than the second pair of apertures 236. Accordingly, the first cross-members 202a is located closer to the mounting surface 230 than the second cross-member 202b. In certain examples, the apertures 234, 236 of each sidewall 238 do not overlap along the major axis M. In certain examples, one of the pairs of apertures 234, 236 is large than the other pair of apertures 236, 234.

In certain implementations, the mounting bracket 206 is configured to mount to a pole. For example, flanges 242 extend from the sidewalls 238 to define slots 244 through which straps may be routed to hold the mounting bracket 206 to the pole. In certain examples, the slots 244 of each flange 242 are aligned along the major axis M. In certain examples, the flanges 242 are angled relative to the sidewalls 238. In certain implementations, the mounting bracket 206 is configured to mount to a wall. For example, additional fasteners can be extended through unused apertures 232 defined in the mounting surface 230. In other example, the bracket adapter 240 defines slots 246 (FIG. 29) through which fasteners may extend to mount the bracket adapter 240 and the mounting bracket 206 to the wall.

In certain implementations, each cable support 204 can be mounted at any of a plurality of positions along a respective cross-member 202. For example, each cable support 204 can be mounted at positions defined by the apertures 222. In certain examples, the cable support body 250 is configured to slide along the cross-member 202. In certain implementations, each cable support 204 includes a body 250 defining a mounting passage 252 sized to receive a respective one of the cross-members 202 therethrough. In certain examples, a portion of the cable support member 204 surrounds the respective cross-member 202.

The cable support body 250 defines a fastener aperture 254 oriented to guide a fastener 256 towards the mounting passage 252 from a first side of the body 250. The fastener 256 extends through the fastener aperture 254, through one of the cross-member apertures 222 aligned with the fastener aperture 254 within the mounting passage 252. In certain implementations, the cable support body 250 is configured to hold a nut 258 in alignment with the fastener aperture 254 at an opposite side of the mounting passage 252 from the fastener aperture 254.

In certain implementations, the cable support body 250 defines a retention location 260 at which the nut 258 may be held in alignment with another aperture 262 leading to the mounting passage 252. In certain examples, the cable support body 250 defines a guide 264 that leads to the retention location 260. Abutment surfaces 266 are disposed at the retention location 260 to hold the nut 258. In certain examples, a latch finger 268 also is disposed at the retention location 260 to retain the nut 258. In the example shown, the latch finger 268 is configured to be depressed by the nut 258 as the nut 258 as being slid along the guide 264 to the retention location 260 and to snap-back when the nut 258 reaches the retention location 260. The latch finger 268 inhibits movement of the nut 258 back along the guide 264.

The cable support body 250 defines the radially-outwardly facing channel 210 extending outwardly from the portion defining the mounting passage 252. In certain examples, the cable support body 250 has a cable support surface 270 that extends away from the mounting portion to define the radially-outwardly facing channel 210. In certain examples, the cable support surface 270 is elongate in the radially outwardly facing direction. In certain examples, the cable support surface 270 has a curvature 272 at an opposite end from the mounting portion to aid in retaining the cable 214 in the channel 210.

In certain implementations, the cable support body 250 includes flanges 274 defining slots 276 through which one or more cable ties can be secured when wrapped around the cable coils 214 at the cable support 204 (e.g., see FIGS. 22 and 23). In certain examples, the flanges 274 extend away from the cable support surface 270. In certain examples, the flanges 274 aid in defining a pocket 278 defined on an opposite side of the cable support body 250 from the cable support surface 270.

In certain implementations, the cable support body 250 is configured to receive a label 290 (e.g., a surface bearing indicia such as text, barcode, QR code, etc.; an RFID tag; a color-coded tag; etc.). In certain implementations, the pocket 278 of the cable support body 250 is configured to receive the label 290. In the example shown, the cable support body 250 includes latch fingers 292 disposed within the pocket 278 to receive catch surfaces on the label 290. In other examples, the label 290 may include latch fingers and the catch surfaces may be disposed within the pocket 278. In still other examples, the label 290 may be otherwise attached to the cable support body 250.

In certain implementations, the cable support body 250 is configured to receive a stiffening member 280 to reinforce the cable support surface 270. The stiffening member 280 is formed of a material that is stronger than the cable support body 250 at least in a load direction D of the cable 214 (see FIG. 36). For example, the stiffening member 280 may be formed of metal while the cable support body 250 is formed of plastic. In certain examples, the stiffening member 280 is configured to mount within the pocket 278. In certain examples, the stiffening member 280 is configured to snap-fit to the cable support body 250.

Figure 34:
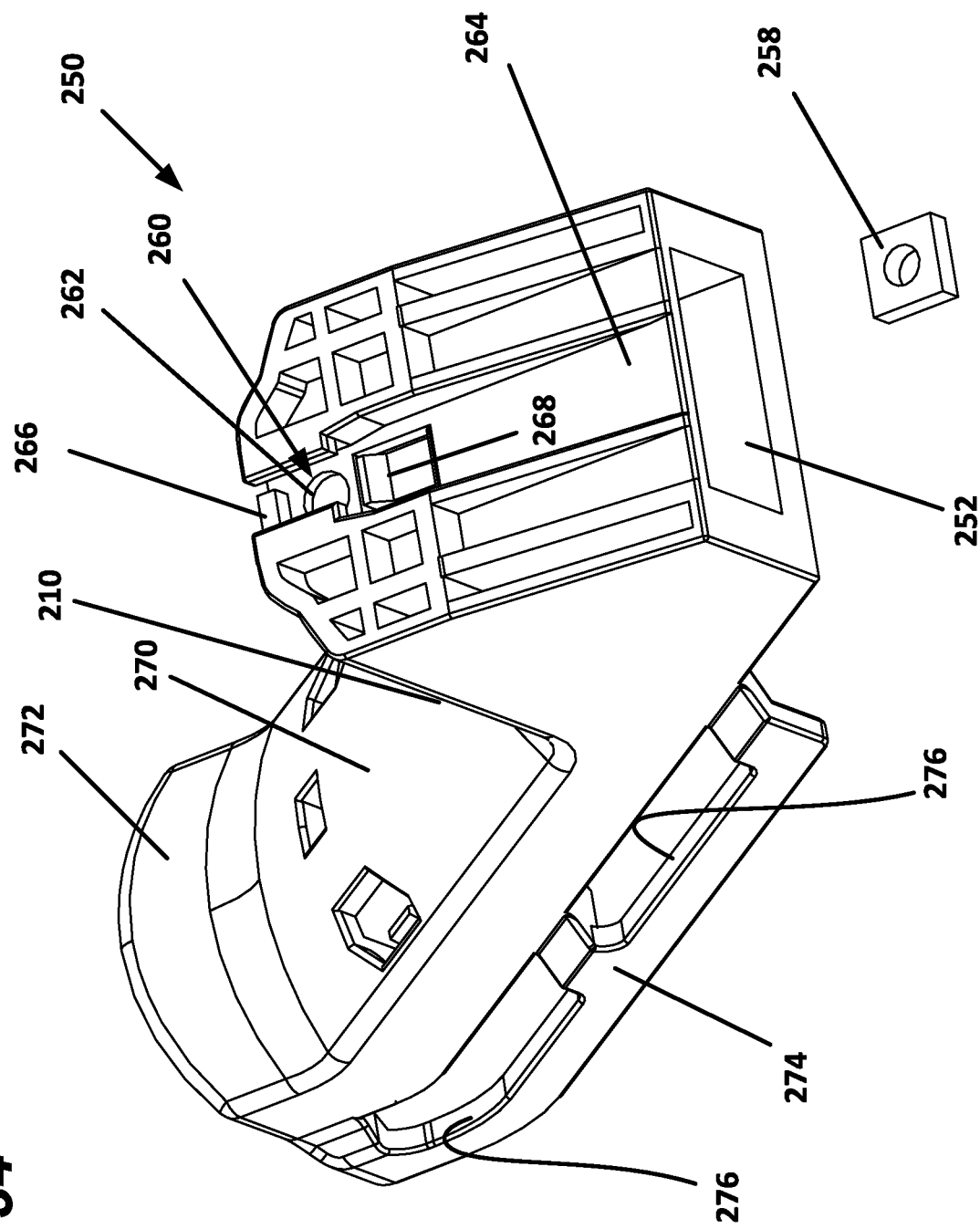
FIG. 34 is a perspective view of an example cable support member suitable for use with the second cable management system of any of FIGS. 24-29.
Figure 35:
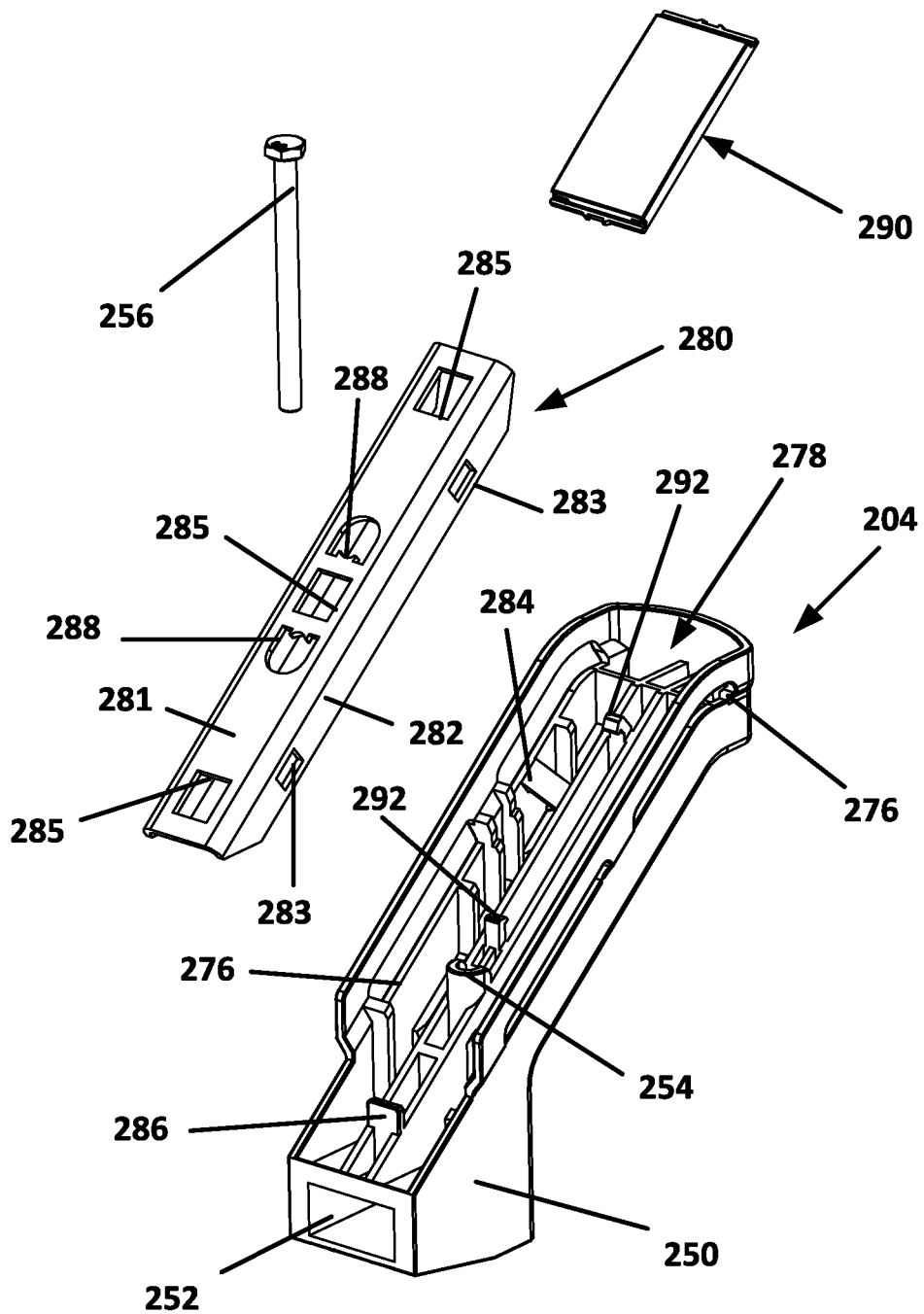
FIG. 35 is another perspective view of the cable support member of FIG. 34 with an optional stiffening member, an optional label, and a fastener 256 shows exploded therefrom.
Figure 36:
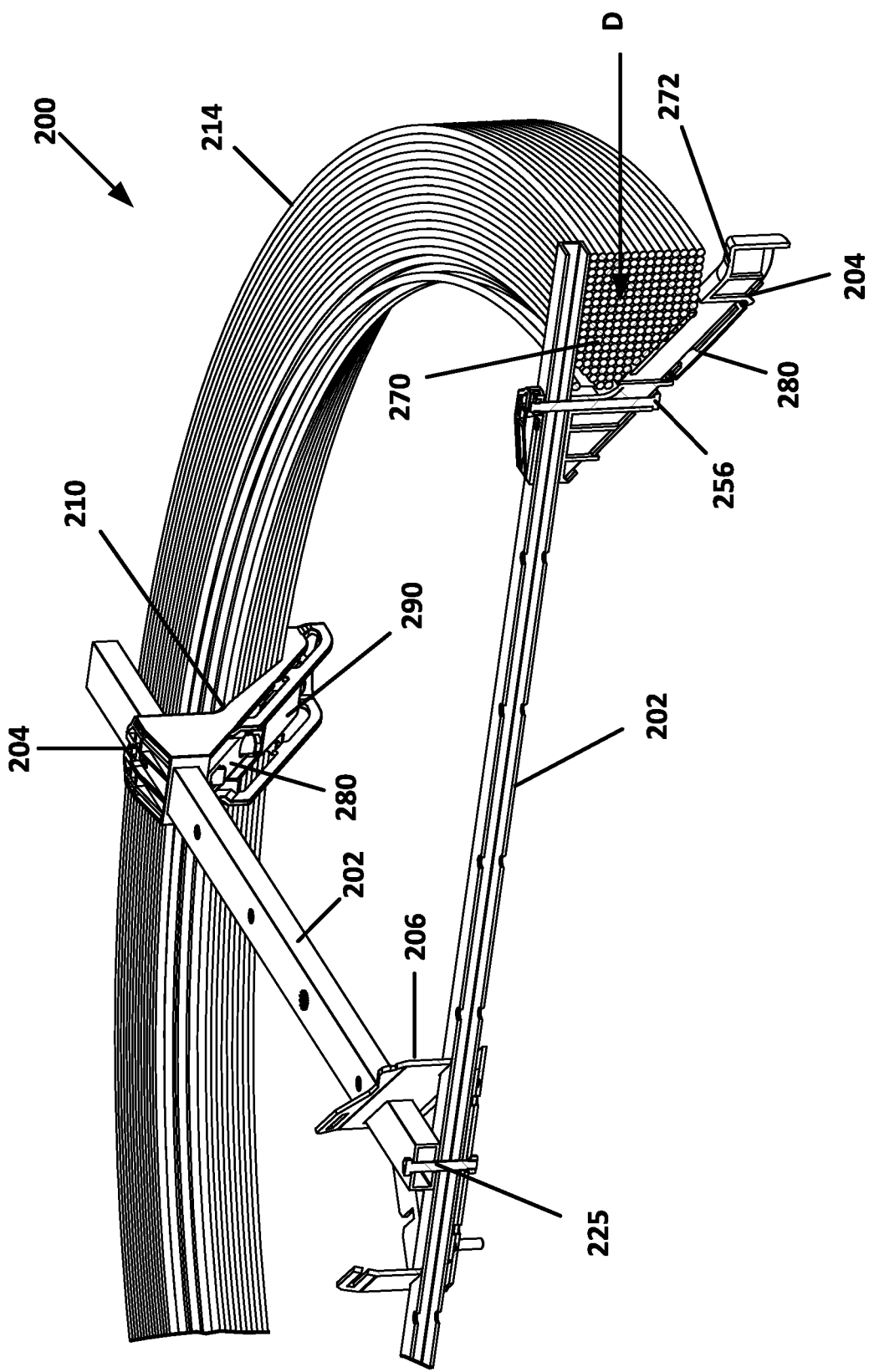
FIG. 36 is a rear perspective view of a partial cross-section of the second cable management system of FIG. 24.

An example stiffening member 280 is shown in FIG. 34. The stiffening member 280 includes a stiffening surface 281 that extends along the cable support body 250 opposite the cable support surface 270. Side flanges 282 extend away from the stiffening surface 281 to define apertures 283. In certain examples, latch fingers 284 are disposed in the pocket 278 to snap-fit or otherwise engage the stiffening member 280 at the apertures 283. The stiffening surface 281 defines apertures 285, 288 to accommodate various structures of the cable support body 250. For example, the apertures 285 accommodate the latch fingers 292 configured to hold the label 290. The aperture 288 accommodates the entrance to the fastener aperture 254.

In certain implementations, the stiffening member 280 is configured to be mounted in either of two orientations. In certain examples, the stiffening member 280 can be mounted in a first orientation or a second orientation that is flipped 180 degrees from the first orientation. For example, the stiffening surface 281 may define two apertures 288 to accommodate the entrance to the fastener aperture 254—a first that aligns with the fastener aperture 254 when the stiffening member 280 is disposed in the first orientation and a second that aligns with the fastener aperture 254 when the stiffening member 280 is disposed in the second orientation.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A cable management system for a cable routed to equipment, the cable management system comprising:
   first and second first cross-members each extending along a respective length between opposite first and second ends, each of the first and second cross-members defining a recessed portion at an intermediate location along the length, the recessed portion of the first cross-member being matable with the recessed portion of the second cross-member;
a bracket arrangement defining a first interface and a second interface, the first interface attaching to the first and second cross-members at the intermediate locations, the second interface being configured to receive the equipment; and
a plurality of cable support members, each cable support member being coupled to one of the first and second cross-members to move along the length, each cable support member being lockable in at least one position along the length of the respective one of the first and second cross-members, the cable support members cooperating to define a cable winding path including at least a first coil path.

2. The cable management system of claim 1, wherein the recessed portions of the first and second cross-members allow the first and second cross-members to be disposed in a common plane when mated together.

3. The cable management system of claim 1, wherein the recessed portions are shaped to enable the first and second cross-members to be configured in either of two angular positions relative to each other at a discretion of the user.

4. The cable management system of claim 1, wherein the cable support members are mounted to the first and second cross-members so that the first coil path is one of a plurality of coil paths if the cable winding path.

5. The cable management system of claim 1, wherein each of the cable support members is configured to slide along the length of the respective one of the first and second cross-members.

6. The cable management system of claim 1, wherein each of the first and second cross-members defines a plurality of discrete stop positions at which the cable support members can be secured.

7. The cable management system of claim 6, wherein the discrete stop positions are defined by apertures in the first and second cross-members, and wherein each cable support member has a fastener that selectively extends into one of the apertures to hold the cable support member at the corresponding stop position.

8. The cable management system of claim 1, wherein each cable support member defines an open-sided cable channel, and wherein each cable support member defines a separate through-passage extending parallel to the open-sided channel.

9. The cable management system of claim 8, further comprising a cable tie that loop through the through-passage and around a coil of cable supported by the open-sided channel.

10. The cable management system of claim 1, wherein each cable support member defines a label receiving region at which an ID plate can be snap-fit.

11. The cable management system of claim 1, further comprising a communications enclosure mounted to the bracket arrangement, wherein the first coil of the cable winding path has a cross-dimension larger than a cross-dimension of the communications enclosure.

12. The cable management system of claim 11, wherein all of the coil paths have cross-dimensions larger than the cross-dimension of the communications enclosure.

13. A cable management system comprising:
first and second cross-members, each of the first and second cross-members defining a recessed portion configured to enable mating of the first and second cross-members in a common plane; and
a plurality of separate cable support members, each cable support member being mounted to a respective one of the first and second cross-members, the cable support members cooperating to define a cable winding path.

14. The cable management system of claim 13, further comprising a mounting bracket attached to the first and second cross-members.

15. The cable management system of claim 13, wherein the first and second cross-members are configured to selectively couple together in a first angular position or a second angular position relative to each other.

16. The cable management system of claim 15, wherein the mounting bracket holds the first and second cross-members in the selected one of the first and second angular positions.

17. The cable management system of claim 13, wherein the recessed portion of each of the first and second cross-members defines a first set of abutment surfaces and a second set of abutment surfaces, wherein the first set of abutment surfaces of the first cross-member engage the first set of abutment surfaces of the second cross-member when the first and second cross-members are disposed in the first angular position, and wherein the second set of abutment surfaces of the first cross-member engage the second set of abutment surfaces of the second cross-member when the first and second cross-members are disposed in the second angular position.

18. The cable management system of claim 13, wherein the cable support members are mounted at pre-determined mounting positions along the first and second cross-members.

19. The cable management system of claim 13, wherein the cable support members are slidable along a length of the respective one of the first and second cross-members.

20. The cable management system of claim 13, wherein the first and second cross-members are formed of metal and the cable support members are formed of molded plastic.

21. A cable management system for managing cable routed to equipment, the cable management system comprising:
a first cross-member extending along a respective length, the first cross-member defining a first recess;
a second cross-member extending along a respective length, the second cross-member defining a second recess shaped to fit with the first recess to mount the first and second cross-members together in one of a first angular position and a second angular position;
a mounting bracket defining a first interface coupled to the first and second cross-members, the mounting bracket holding the first and second cross-members in the one of the first angular position and the second angular position;
oppositely facing first cable support members disposed at the first cross-member; and
oppositely facing second cable support members disposed at the second cross-member, the first and second cable support members cooperating to define a cable winding path.

22. The cable management system of claim 21, wherein the first cable support members are separate pieces from the first cross-member.

23. The cable management system of claim 21, wherein the mounting bracket defines a second interface configured to receive and support the equipment.

24. The cable management system of claim 23, wherein the second interface is disposed at an opposite side of the mounting bracket from the first interface.

25. The cable management system of claim 21, wherein the first and second cross-members extend along a reference plane when disposed in the first angular position and extend along the reference plane when disposed in the second angular position.

26. The cable management system of claim 21, wherein the first cable support members include a first plurality of cable support members facing in a first direction and a second plurality of cable support members facing in a second direction opposite the first direction.

27. The cable management system of claim 21, wherein each of the first cable supports is positionable at any of a plurality of positions along the first cross-member and each of the second cable supports is positionable at any of a plurality of mounting positions along the second cross-member.

28. The cable management system of claim 27, wherein each of the first and second cable support members is slidable along the respective one of the first and second cross-members between the mounting positions.

* * * * *